US012501491B2

(12) United States Patent
Duan et al.

(10) Patent No.: US 12,501,491 B2
(45) Date of Patent: Dec. 16, 2025

(54) RACH BASED ON FMCW CHANNEL SOUNDING

(71) Applicant: QUALCOMM Incorporated, San Diego, CA (US)

(72) Inventors: Weimin Duan, San Diego, CA (US); Jing Lei, San Diego, CA (US); Kangqi Liu, San Diego, CA (US); Tingfang Ji, San Diego, CA (US); Jing Jiang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 322 days.

(21) Appl. No.: 18/364,457

(22) Filed: Aug. 2, 2023

(65) Prior Publication Data

US 2025/0048431 A1    Feb. 6, 2025

(51) Int. Cl.
*H04W 74/0833*    (2024.01)
*H04B 7/06*    (2006.01)
*H04L 25/02*    (2006.01)
*H04W 72/0457*    (2023.01)

(52) U.S. Cl.
CPC ...... *H04W 74/0833* (2013.01); *H04B 7/0626* (2013.01); *H04L 25/0202* (2013.01); *H04W 72/0457* (2023.01)

(58) Field of Classification Search
CPC .......... H04W 74/0833; H04W 72/0457; H04B 7/0626; H04L 25/0202
See application file for complete search history.

(56) References Cited

U.S. PATENT DOCUMENTS

| 2018/0027437 | A1* | 1/2018 | Vitthaladevuni | ... H04W 52/325 370/252 |
| 2023/0057352 | A1* | 2/2023 | Taherzadeh | ........... H04L 5/0053 |
| 2023/0065929 | A1* | 3/2023 | He | ...................... H04W 74/004 |
| 2023/0076874 | A1* | 3/2023 | Jeon | ........................ G01S 7/021 |
| 2024/0154717 | A1* | 5/2024 | Farhadi | ................. H04L 1/0026 |
| 2024/0333453 | A1* | 10/2024 | Ramakrishna | ....... H04B 17/336 |

* cited by examiner

*Primary Examiner* — Umar Cheema
(74) *Attorney, Agent, or Firm* — Procopio, Cory, Hargreaves & Savitch LLP

(57) ABSTRACT

A method of wireless communication is disclosed herein. The method includes measuring a WB channel via FMCW channel estimation. The method includes selecting a WB SSB and a subband in a BWP based on the measured WB channel. The method includes performing a RACH procedure based on the WB SSB and the subband in the BWP. The method includes outputting an indication of the performed RACH procedure based on the WB SSB and the subband in the BWP.

30 Claims, 18 Drawing Sheets

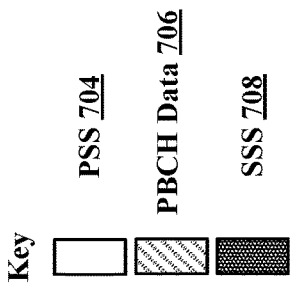
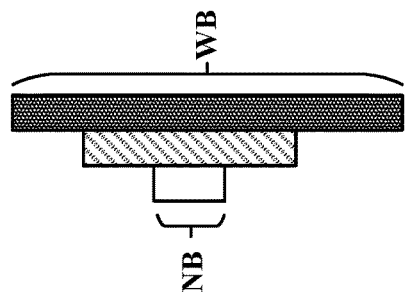
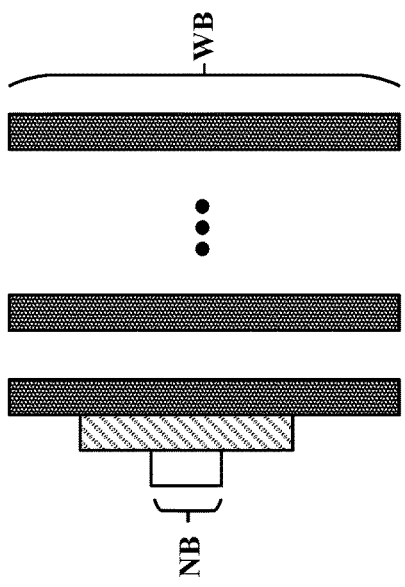
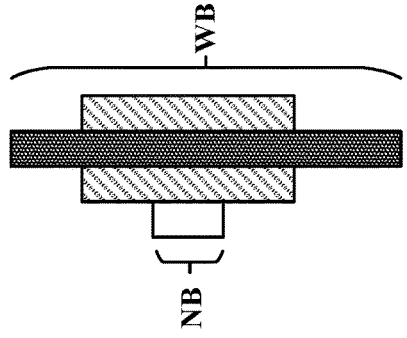
FIG. 7

RACH BASED ON FMCW CHANNEL SOUNDING

TECHNICAL FIELD

The present disclosure relates generally to communication systems, and more particularly, to channel sounding.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus includes at least one memory; and at least one processor coupled to the at least one memory and, based at least in part on information stored in the at least one memory, the at least one processor, individually or in any combination, is configured to measure a wideband (WB) channel via frequency modulated continuous wave (FMCW) channel estimation; select a WB synchronization signal block (SSB) and a subband in a bandwidth part (BWP) based on the measured WB channel; perform a random access channel (RACH) procedure based on the WB SSB and the subband in the BWP; and output an indication of the performed RACH procedure based on the WB SSB and the subband in the BWP.

In an aspect of the disclosure, a method, a computer-readable medium, and an apparatus at a network node are provided. The apparatus includes at least one memory; and at least one processor coupled to the at least one memory and, based at least in part on information stored in the at least one memory, the at least one processor, individually or in any combination, is configured to transmit a wideband (WB) synchronization signal block (SSB), where the WB SSB is associated with a bandwidth part (BWP) and a subband in the BWP; and perform a random access channel (RACH) procedure based on the WB SSB, where the RACH procedure is associated with a WB channel, and where the WB channel is associated with frequency modulated continuous wave (FMCW) channel estimation.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7 is a diagram illustrating example WB synchronization signal blocks (SSBs).

DETAILED DESCRIPTION

Figure 1:
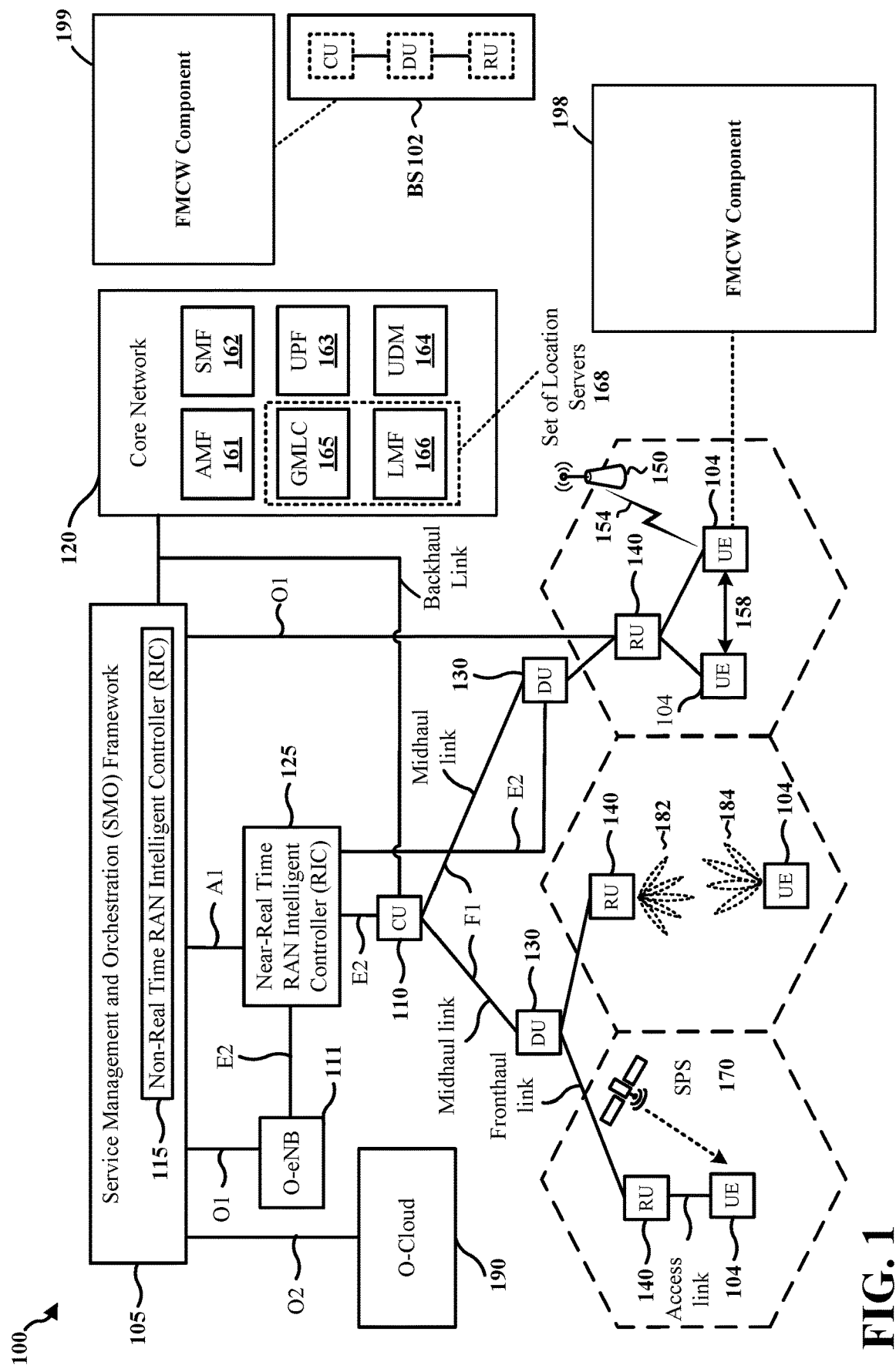
FIG. 1 is a diagram illustrating an example of a wireless communications system and an access network.

UEs in some wireless communication systems (e.g., 5G NR) may estimate a channel for wireless communications using orthogonal frequency division multiplexing (OFDM) based channel estimation. However, a UE that utilizes OFDM based channel estimation may not be able to estimate a channel over an entire bandwidth in a single pass. Instead, the UE may utilize frequency hopping in order to estimate the channel, which may be associated with increased power consumption and/or an increased amount of time to estimate the channel. FMCW based channel estimation may enable a UE to estimate a channel over an entire bandwidth in a single pass. However, a RACH procedure in a wireless communication system may not be configured for FMCW based channel estimation.

Various aspects described herein generally relate to FMCW based channel estimation. Some aspects more specifically relate to an enhanced RACH procedure based on FMCW channel sounding. In an example, a UE measures a wideband (WB) channel via frequency modulated continuous wave (FMCW) channel estimation. The UE selects a WB synchronization signal block (SSB) and a subband in a bandwidth part (BWP) based on the measured WB channel. The UE performs a random access channel (RACH) procedure based on the WB SSB and the subband in the BWP. The UE outputs an indication of the performed RACH procedure based on the WB SSB and the subband in the BWP.

Particular aspects of the subject matter described in this disclosure can be implemented to realize one or more of the following potential advantages. In some examples, by measuring the WB channel via FMCW channel estimation and by performing the RACH procedure based on a WB SSB and a subband that are selected based on the measured WB channel, the UE may be able to transmit and/or receive wireless communications in a more rapid manner compared to a UE that utilizes OFDM based channel estimation to estimate a channel. Furthermore, the UE may utilize less power compared to a UE that utilizes OFDM based channel estimation to estimate a channel.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHz), FR4 (71 GHz-114.25 GHZ), and FR5 (114.25 GHZ-300 GHZ). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an FMCW component 198 that may be configured to measure a wideband (WB) channel via frequency modulated continuous wave (FMCW) channel estimation; select a WB synchronization signal block (SSB) and a subband in a bandwidth part (BWP) based on the measured WB channel; perform a random access channel (RACH) procedure based on the WB SSB and the subband in the BWP; and output an indication of the performed RACH procedure based on the WB SSB and the subband in the BWP. In certain aspects, the base station 102 may have an FMCW component 199 that may be configured to transmit a wideband (WB) synchronization signal block (SSB), where the WB SSB is associated with a bandwidth part (BWP) and a subband in the BWP; and perform a random access channel (RACH) procedure based on the WB SSB, where the RACH procedure is associated with a WB channel, and where the WB channel is associated with frequency modulated continuous wave (FMCW) channel estimation. Although the following description may be focused on 5G and 6G wireless communication systems, the concepts presented herein may also be applicable to other types of communication systems as well.

Figure 2:
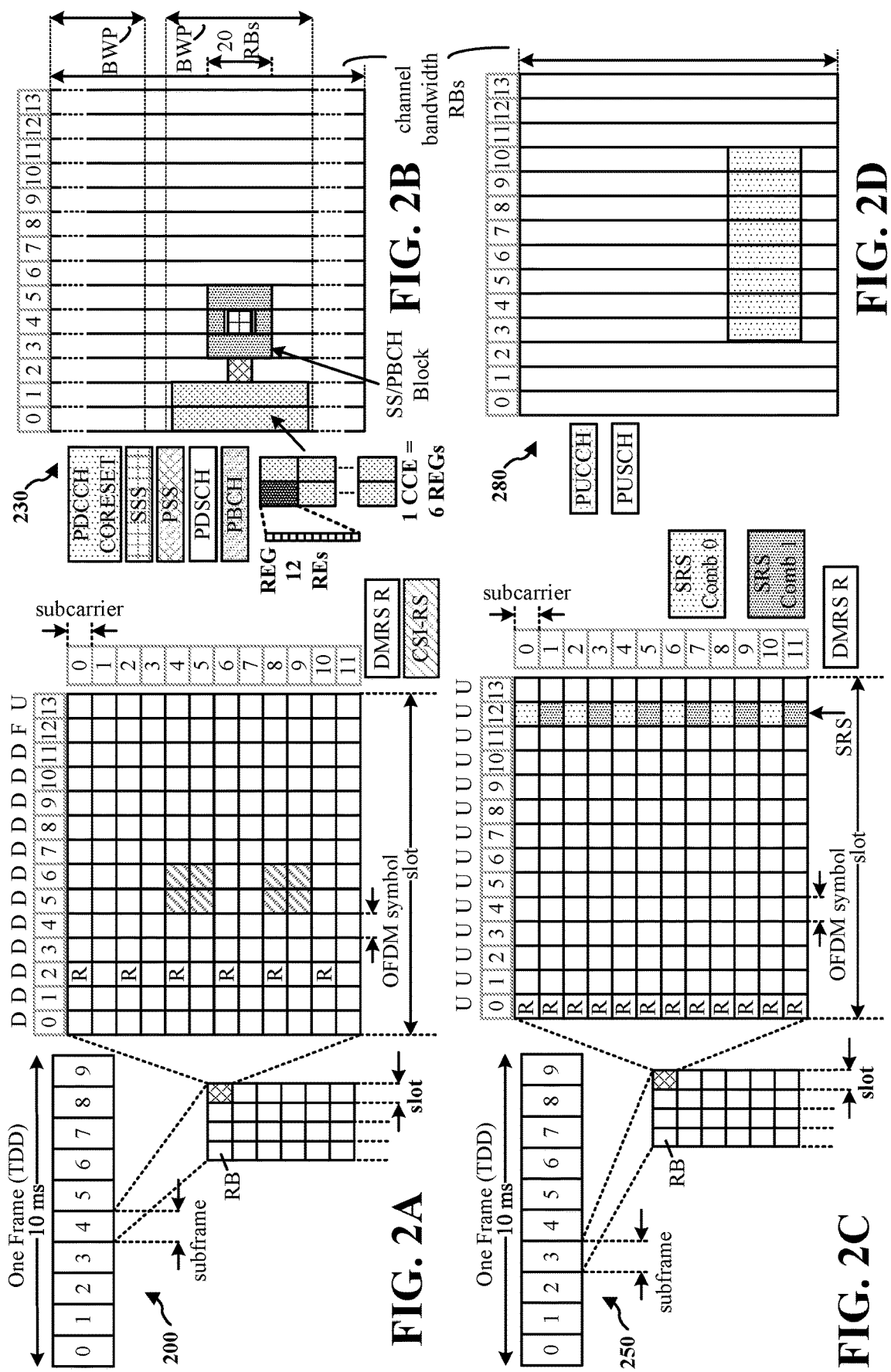
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal. Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu*15$kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
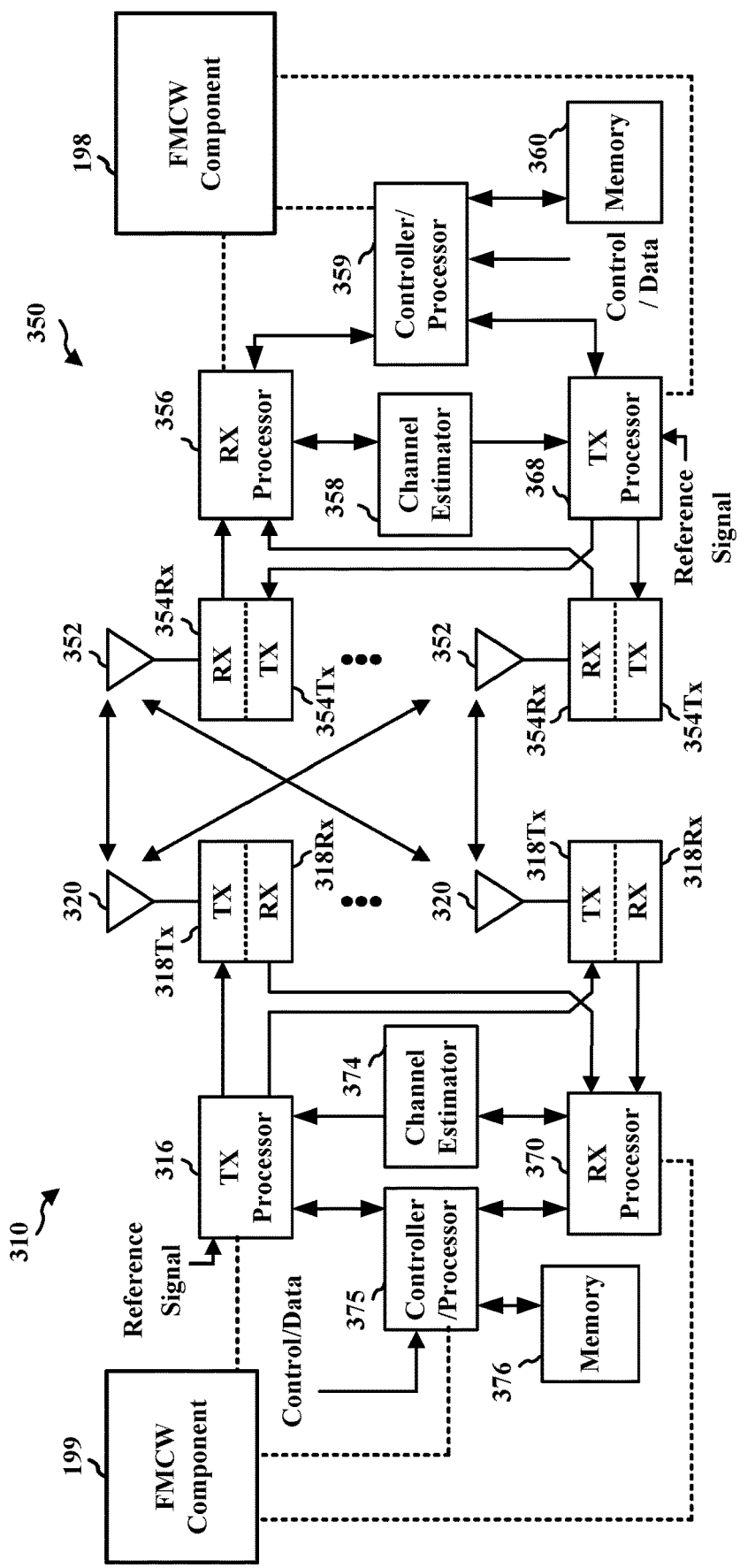
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the FMCW component 198 of FIG. 1.

At least one of the TX processor 316, the RX processor 370, and the controller/processor 375 may be configured to perform aspects in connection with the FMCW component 199 of FIG. 1.

Figure 4:
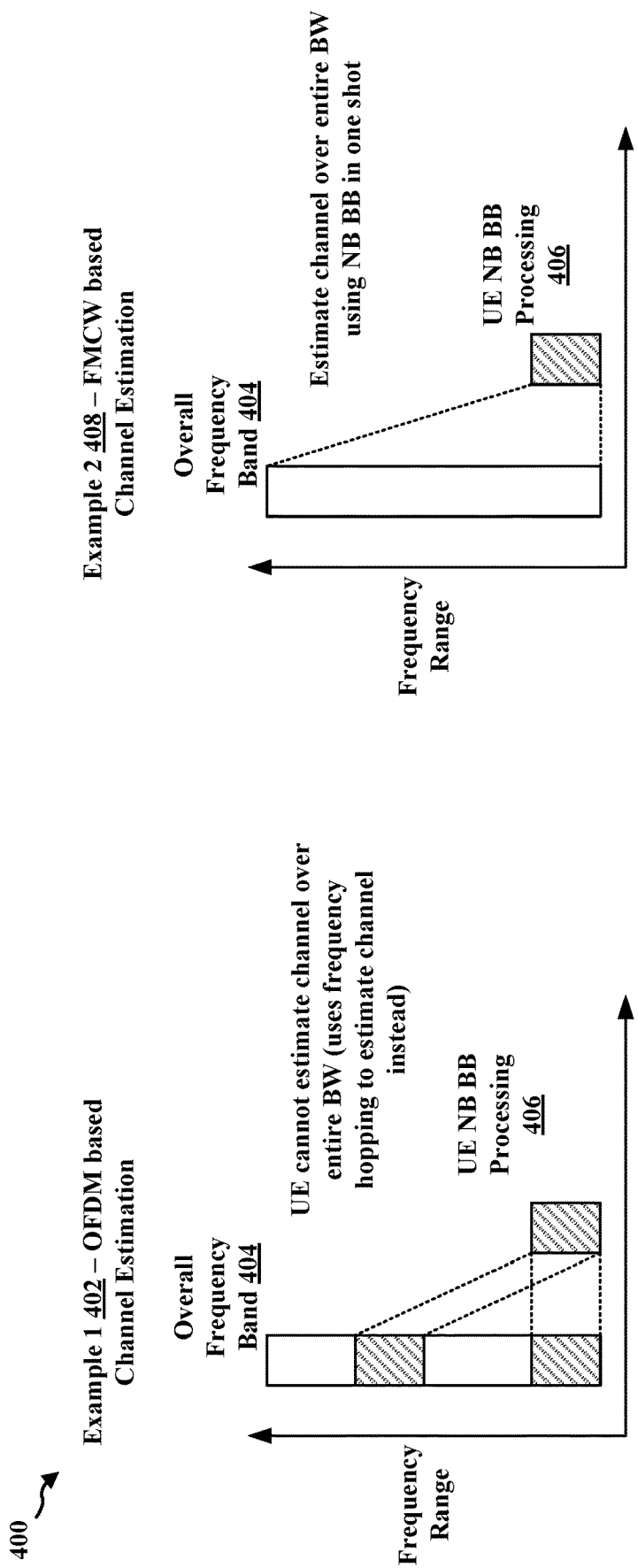
FIG. 4 is a diagram illustrating example aspects of channel estimation.

FIG. 4 is a diagram 400 illustrating example aspects of channel estimation. A frequency modulated continuous wave (FMCW) system may refer to a system that transmits and/or receives a signal of a known stable continuous wave that varies up and down in frequency over a fixed period of time by a modulating signal. An FMCW system may be utilized for sensing (e.g., ranging) purposes. An FMCW system may also be utilized to transmit and/or receive data wirelessly, that is, a device in a wireless communication system may utilize FMCW in order to transmit and/or receive data wirelessly.

In order to transmit and/or receive data over a wireless communication system, a UE may estimate a channel associated with the wireless communication system by receiving and/or transmitting reference signal(s). A channel may refer to a medium (e.g., air) between two end points (e.g., a transmitter and a receiver) of a wireless communication system. Estimating a channel may refer to determining properties (e.g., frequency properties, time properties, and position properties) of the channel such that data may be transmitted and/or received via the channel. Estimating a channel may also be referred to as channel estimation or channel sounding.

In a first example 402, a UE (e.g., the UE 104, the UE 350, etc.) may estimate a DL channel using OFDM based channel estimation. OFDM based channel estimation may be utilized by UEs configured for certain wireless communication systems (e.g., 5G NR). A UE may not be able to estimate a channel over an entire bandwidth (e.g., an overall frequency band 404) in a single pass using OFDM based channel estimation. Instead, the UE may first perform narrowband (NB) baseband (BB) processing 406. NB may refer to a range of frequencies that have a small fractional bandwidth. BB may refer to a range of frequencies occupied by a signal that has not been modulated to higher frequencies. After performing the NB BB processing 406, the UE may engage in frequency hopping in order to estimate the channel over the entire bandwidth (e.g., the overall frequency band 404). Frequency hopping may refer to rapidly changing a carrier frequency among many frequencies occupying a large spectral band. The UE may identify a suitable subband in the overall frequency band 404 for a transmission (e.g., an UL transmission) based on the estimated channel.

In a second example 408, a UE may estimate a DL channel using FMCW based channel estimation. FMCW based channel estimation may refer to using an FMCW system to perform channel estimation. FMCW based channel estimation may also be referred to as FMCW channel estimation. A UE may be able to estimate the channel over the entire bandwidth (e.g., the overall frequency band 404) in a single pass (i.e., a single shot) using FMCW based channel estimation. For instance, the UE may perform the NB BB processing 406 and the UE may estimate the entire channel (e.g., the overall frequency band 404) in a single pass based on the NB BB processing 406.

Estimating the channel in a single pass may be associated with various advantages, such as reduced UE power consumption and/or reduced processing times. The UE may identify a suitable subband in the overall frequency band 404 for a transmission (e.g., an UL transmission) based on the estimated channel.

A 5G NR wireless communication system may operate at FR1 (410 MHZ-7.125 GHz) and/or FR2 (24.25 GHZ-52.6 GHZ). Other wireless communications systems (e.g., a 6G wireless communication system) may operate at an ultra-wide system bandwidth (which may also be referred to as wideband (WB)). For instance, a wireless communication system (e.g., a 6G wireless communication system) may operate at 400 MHZ-8 GHZ, 6 GHZ, and subTHz (e.g., 92 GHZ-115 GHZ, 130 GHZ-175 GHZ) frequency ranges (i.e., WB frequency ranges). Some UEs (e.g., IoT devices) may not support all frequency ranges supported by the wireless communication system (e.g., a 6G wireless communication system). FMCW based channel estimation may be useful to a UE, as the UE may scan a relatively large bandwidth in order to identify a suitable subband for UL and/or DL communications. Furthermore, FMCW based channel estimation may be useful for a network. In an example, a base station (e.g., a gNB) may receive indications of suitable subbands of multiple UEs, where the suitable subbands may be determined by FMCW based channel estimation. The base station may efficiently allocate resources to the multiple UEs based on the suitable subbands.

Figure 5:
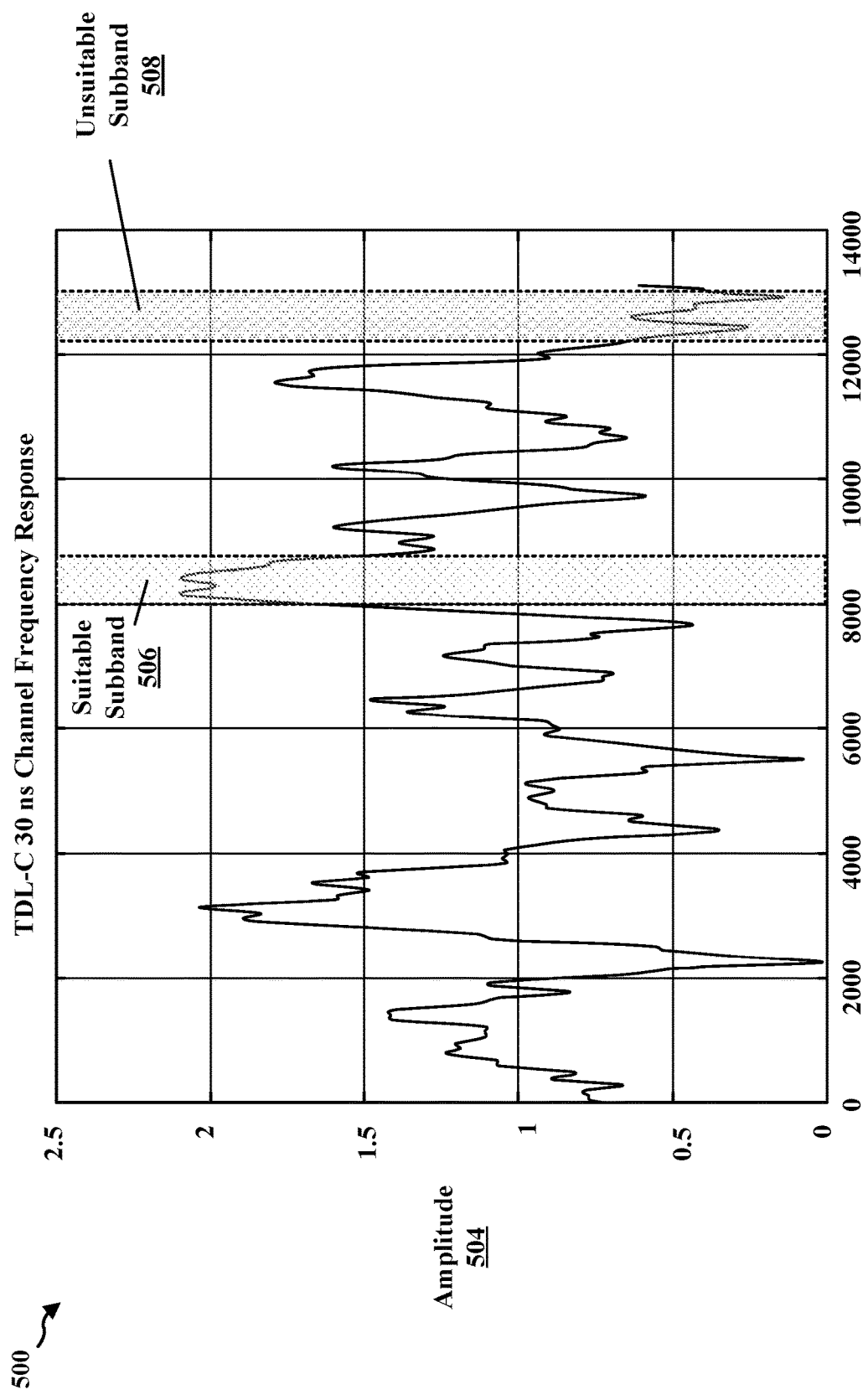
FIG. 5 is a diagram illustrating example aspects of frequency modulated continuous wave (FMCW) wideband (WB) channel estimation.

FIG. 5 is a diagram 500 illustrating example aspects of FMCW based channel estimation. In the diagram 500, the x-axis represents a resource element (RE) index 502 and the y-axis represents an amplitude 504. In an example, a UE (e.g., the UE 104, the UE 350, etc.) may perform FMCW based channel estimation in order to identify a suitable subband 506 and an unsuitable subband 508. The UE may transmit an indication of the suitable subband 506 to a base station (e.g., a gNB), and the base station may schedule resources (e.g., resources for UL transmissions and/or DL transmissions) for the UE on the suitable subband 506. Additionally, or alternatively, the UE may transmit an indication of the unsuitable subband 508 to the base station, and the base station may avoid scheduling resources (e.g., resources for UL transmissions and/or DL transmissions) for the UE on the unsuitable subband 508.

Figure 6:
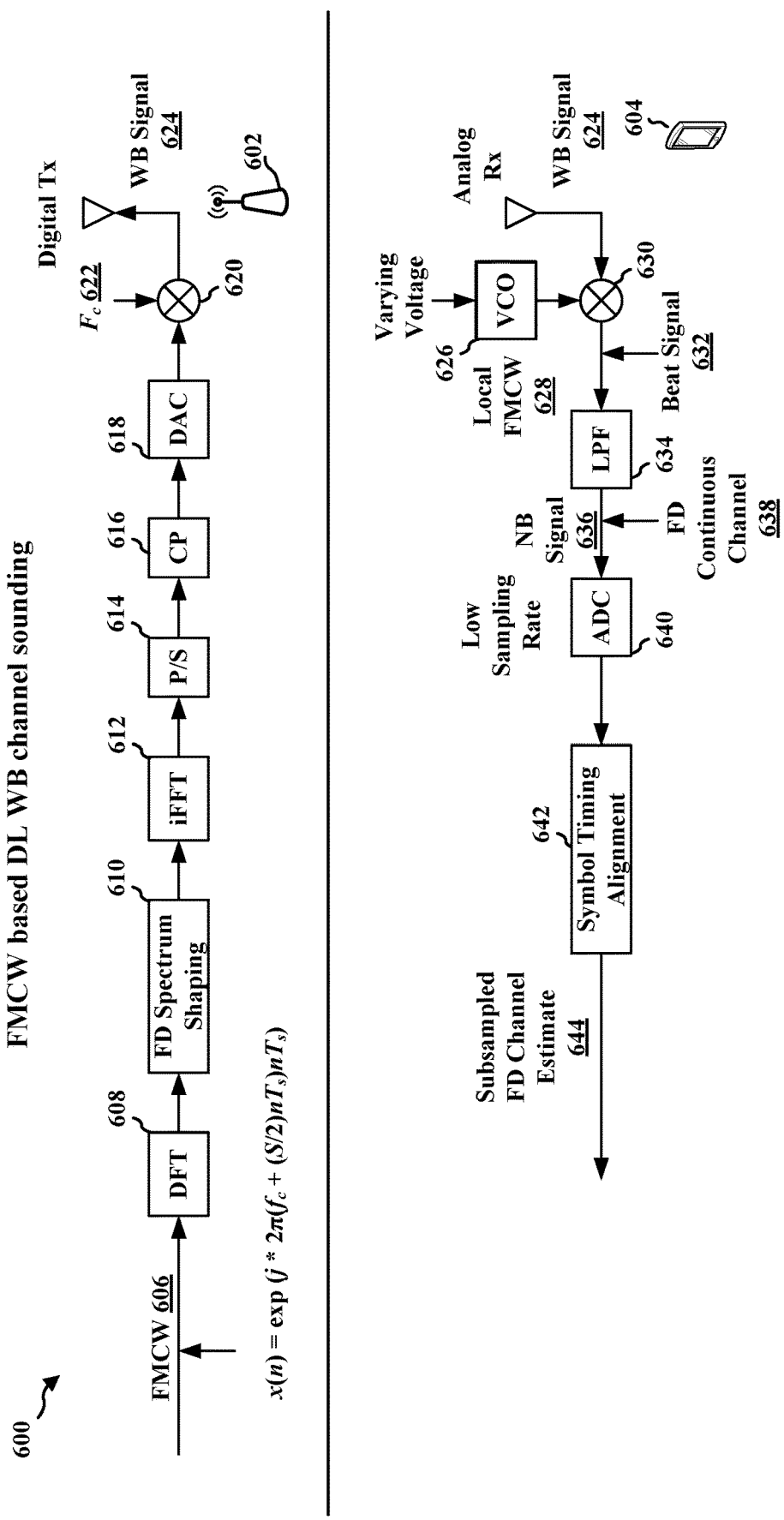
FIG. 6 is a diagram illustrating example aspects of FMCW based DL WB channel sounding.

FIG. 6 is a diagram 600 illustrating example aspects of frequency modulated continuous wave (FMCW) based DL wideband (WB) channel sounding. The diagram 600 depicts processing performed by a base station 602 (upper half) and processing performed by a UE 604 (lower half). The processing performed by the base station 602 and/or the processing performed by the UE 604 may be implemented in hardware and/or software.

The base station 602 may generate an FMCW 606 (which may also be referred to in FIG. 6 as a frequency modulated continuous waveform) according to equation (I) below.

$$x(n) = \exp\left(j * 2\pi \left(f_c + \frac{S}{2}nT_s\right)nT_s\right) \quad (I)$$

The base station 602 may perform a DFT 608 on the FMCW 606. The base station 602 may perform frequency domain (FD) spectrum shaping 610 on the output of the DFT 608. The base station 602 may perform an iFFT 612 on the output of the FD spectrum shaping 610. The base station 602 may perform a parallel to serial conversion (P/S) 614 on the output of the iFFT 612. The base station 602 may add a cyclic prefix (CP) 616 to the output of the P/S 614. The base station 602 may then perform a digital-to-analog conversion (DAC) 618. The base station 602 may modulate 620 the output of the DAC 618 with a carrier frequency 622 (referred to in FIG. 6 as "$f_c$"). The base station 602 may then transmit a WB signal 624 based on the modulated output, where the WB signal 624 may be a digital signal.

The UE 604 may receive the WB signal 624. A voltage-controlled oscillator (VCO) 626 may generate a local FMCW 628 by varying a voltage. The UE 604 may mix 630 the local FMCW 628 with the WB signal 624 to generate a beat signal 632. The UE 604 may filter the beat signal 632 via a low-pass filter (LPF) 634 to obtain a NB signal 636, where the NB signal 636 may be associated with a FD continuous channel 638. The UE 604 may perform a (low sampling rate) analog-to-digital conversion (ADC) 640 on the NB signal 636. The UE 604 may perform symbol timing alignment 642 on the output of the ADC 640. The UE 604 may obtain a subsampled FD channel estimate 644 based on the output of the symbol timing alignment 642.

In OFDM based DL channel estimation, a UE may receive a digital signal. The UE may perform a high rate ADC on the digital signal to convert the digital signal to an analog signal. The UE may perform FD channel estimation in the frequency domain after performing a FFT. In contrast, in FMCW based DL channel estimation, the UE may receive an analog signal. The UE may perform a low rate ADC on the analog signal. The UE may perform FD channel estimation in a beat signal domain after mixing with a local FMCW. The high rate ADC may be associated with higher complexity and power consumption compared to the low rate ADC. Thus, FMCW based DL channel estimation may be associated with reduced complexity and reduced power consumption compared to OFDM based DL channel estimation.

Table 2 is a comparison of a sampling rate and ADC characteristics under different bandwidth (BWs) and subcarrier spacings (SCSs).

TABLE 2

Comparison of sampling rate/ADC characteristics under different BWs and SCSs

| BW, SCS | Samples per Symbols at Digital Rx | At Digital Rx | At Analog Rx (Per-RB Channel estimation granularity) |
|---|---|---|---|
| 100 MHz, 30 KHz | 4096 | 122.88 MHz | 8.19 MHz |
| 400 MHz, 30 KHz | 16384 | 491.52 MHz | 32.76 MHz |
| 400 MHz, 120 KHz | 4096 | 491.52 MHz | 32.76 MHz |
| 1600 MHz, 120 KHz | 16384 | 1966.08 MHz | 131.04 MHz |
| ADC Comparison | | | 6.67% of Digital Rx |

As illustrated above, analog FMCW Tx may have a lower ADC rate than an ADC rate of digital Tx. Table 2 thus indicates that there may be a benefit in measuring (i.e., estimating) a WB channel using a NB BB chain. In one aspect, an ADC characteristic reduces as an FD channel estimate resolution reduces.

FIG. 7 is a diagram 700 illustrating example WB synchronization signal blocks (SSBs). A base station may transmit a WB SSB. A WB SSB may be utilized by a UE in order to enable the UE to find a cell when entering a wireless communication system (e.g., a 6G wireless communication system). The UE (i.e., an Rx point) may process WB RFs associated the WB SSB using narrow band (NB) baseband (BB) processing. A WB SSB may include one NB primary synchronization signal (PSS), one or more WB secondary synchronization signals (SSSs), and physical broadcast channel (PBCH) data. The UE may first search for the NB PSS in order to synchronize with a periodicity of a cell. After the UE has detected the NB PSS, the UE may determine a timing of the WB SSS. The UE may then detect the WB SSS using the determined timing. The UE may determine a PCI of the cell using the WB SSS. The PBCH data may carry a MIB which may include information for acquiring remaining system information about the cell broadcast by a network. FMCW based processing (e.g., phase-coded FMCW based processing) may be utilized to generate the WB SSS(s). A sequence number (i.e., a number of a sequence) for the WB SSS phase coding may be $N_{SSS}^{(i)}$. In one aspect, the WB SSS may be a WB signal that linearly ramps overs a whole bandwidth. The WB SSS may also be utilized for sensing purposes. A physical cell ID associated with a WB SSB may be determined as $\alpha N_{PSS} + \Sigma_{n=1}^{N} b_n N_{SSS}^{(n)}$, where N represents a number of SSS(s). In an example, a=3, $b_1$=1, and N=1.

In a first example 702, a WB SSB may include a PSS 704, PBCH data 706, and an SSS 708. The PSS 704 may be associated with a NB and the SSS 708 may be associated with a WB. The PSS 704, the PBCH data 706, and the SSS 708 may be transmitted at different time instances (e.g., in different slots).

In a second example 710, a WB SSB may include a PSS 704, (two instances) of the PBCH data 706, and an SSS 708, where a first instance of the PBCH data 706 may occur in a slot prior to a slot of the SSS 708, and where a second instance of the PBCH data 706 may occur in a slot after a slot of the SSS 708. The PSS 704 may be associated with a NB and the SSS 708 may be associated with a WB.

In a third example 712, a WB SSB may include a PSS 704, PBCH data 706, and multiple (i.e., N, where N is a positive integer) instances of a SSS 708. The PSS 704 may be associated with a NB and the SSS 708 may be associated with a WB.

UEs in some wireless communication systems (e.g., 5G NR) may estimate a channel for wireless communications using OFDM based channel estimation. However, a UE that utilizes OFDM based channel estimation may not be able to estimate a channel over an entire bandwidth in a single pass. Instead, the UE may utilize frequency hopping in order to estimate the channel, which may be associated with increased power consumption and/or an increased amount of time to estimate the channel. FMCW based channel estimation may enable a UE to estimate a channel over an entire bandwidth in a single pass. However, a RACH procedure in a wireless communication system may not be configured for FMCW based channel estimation.

Various technologies pertaining to an enhanced RACH procedure based on FMCW channel sounding are described herein. In an example, a UE measures a wideband (WB) channel via frequency modulated continuous wave (FMCW) channel estimation. The UE selects a WB synchronization signal block (SSB) and a subband in a bandwidth part (BWP) based on the measured WB channel. The UE performs a random access channel (RACH) procedure based on the WB SSB and the subband in the BWP. The UE outputs an indication of the performed RACH procedure based on the WB SSB and the subband in the BWP. Vis-à-vis measuring the WB channel via FMCW channel estimation and performing the RACH procedure based on a WB SSB and a subband that are selected based on the measured WB channel, the UE may be able to transmit and/or receive wireless communications in a more rapid manner compared to a UE that utilizes OFDM based channel estimation to estimate a channel. Furthermore, the UE may utilize less power compared to a UE that utilizes OFDM based channel estimation to estimate a channel.

Techniques for the application of channel sounding with a WB SSB, including performing adaptive RACH occasion selection based on the channel sounding, are described herein. Also described herein are techniques for 1) inserting CSI in a RACH related message and 2) using a WB initial UL BWP.

Figure 8:
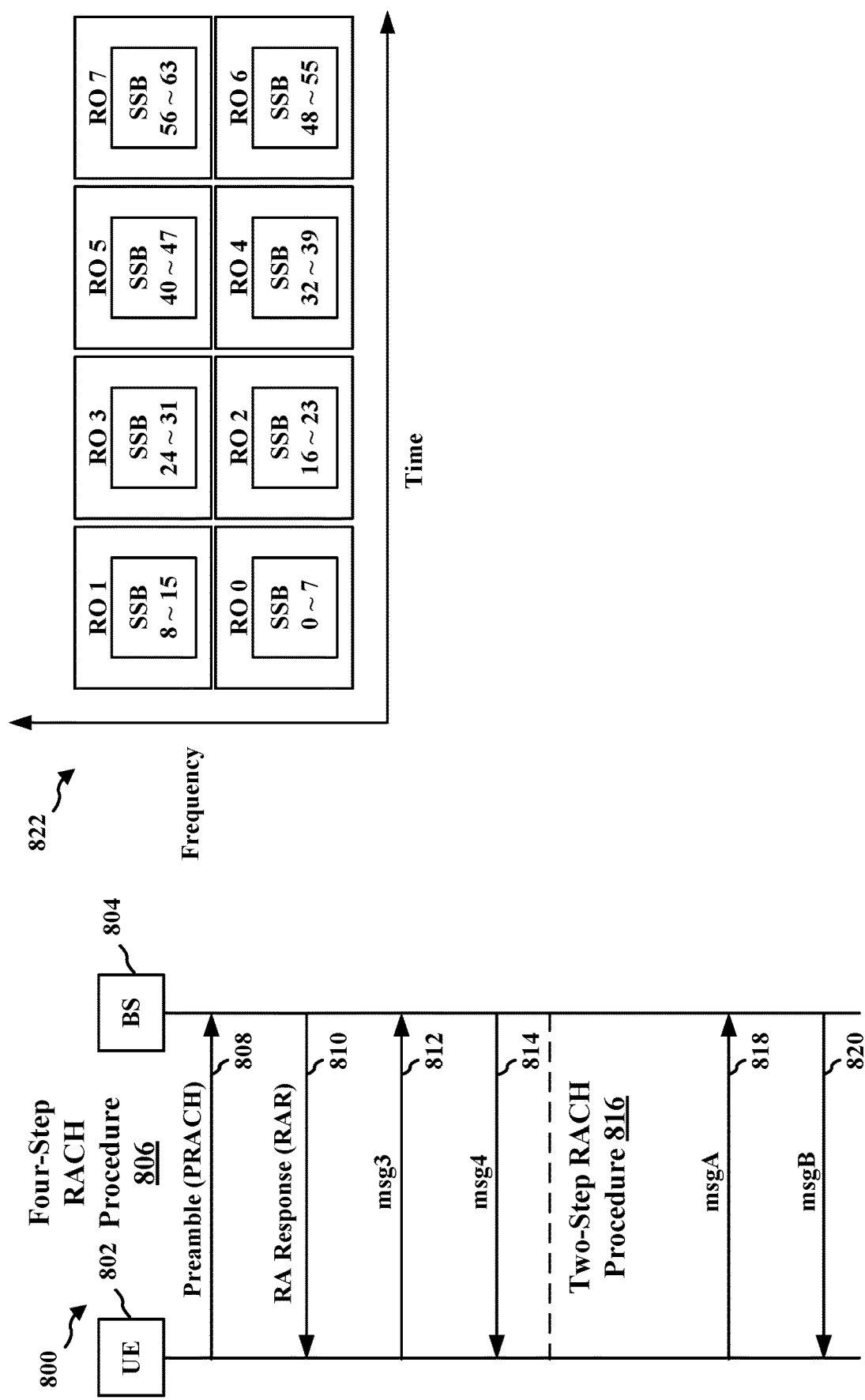
FIG. 8 is a diagram illustrating example aspects of a random access channel (RACH) procedure.

FIG. 8 is a diagram 800 illustrating example aspects of a random access channel (RACH) procedure. A RACH procedure may enable a UE to initially access a network from an idle/inactive state. The RACH procedure may also enable a UE to establish synchronization with a new cell during a handover. Furthermore, the RACH procedure may enable the UE to reestablish UL synchronization with a current cell if synchronization with the current cell has been lost (e.g., due to a long inactivity period). The RACH procedure may enable a UE to request uplink scheduling if a scheduling request resource has not been assigned to the UE. The RACH procedure may also enable the UE to request a transmission of non-broadcast system information. The RACH procedure may also be used as part of a beam recovery procedure. As will be described in greater detail below, the RACH procedure may be based on FMCW based channel estimation.

A RACH procedure may be a four-step RACH procedure 806. In the four-step RACH procedure 806, at 808, a UE 802 may transmit a preamble (which may also be referred to as a physical random access channel (PRACH)) to a base station 804. The preamble may be based on a random-access configuration provided as part of system information block type 1 (SIB1). Upon receiving the preamble, at 810, the base station 804 may transmit a random access response (RAR) that indicates a reception of the preamble and that provides a time-alignment command for adjusting transmission timing of the UE 802 based on the (received) preamble. At 812, after receiving the RAR, the UE 802 may transmit a message 3 (msg3) to the base station 804 in order to resolve potential collisions due to simultaneous transmission of the same preamble from different UEs. At 814, upon receiving the msg3, the base station 804 may transmit a message 4 (msg4) to resolve the potential collisions.

A RACH procedure may be a two-step RACH procedure 816. In the two-step RACH procedure 816, the UE 802 may transmit a message A (msgA) to the base station 804. The msgA may include an uplink preamble transmission and a PUSCH data transmission. At 820, upon receiving the msgA the base station 804 may transmit a message B (msgB) to the UE 802. The msgB may indicate a reception of the msgA and may provide a timing alignment and may resolve collision issues associated with the msgA. The msgB may also include an indication to fall back to the four-step RACH procedure 806 in the case that the two-step RACH procedure 816 is unable to be completed successfully.

Various aspects pertaining to RACH enhancements (e.g., enhancements to a RACH procedure, such as the four-step RACH procedure 806 and/or the two-step RACH procedure 816) are now described. The base station 804 may configure an initial DL BWP (e.g., a 6G initial DL BWP) as a WB BWP. For instance, the base station 804 may transmit a configuration to the UE 802 that configures the initial DL BWP as the WB BWP. The initial DL BWP may cover (i.e., encompass) a WB SSB that includes a WB FMCW (i.e., a WB SSS, such as the SSS 708 in the first example 702, the second example 710, and/or the third example 712), that is, the initial DL BWP may be associated with a first frequency and a second frequency that is greater than the first frequency, where the WB SSB (and hence the WB SSS) may be associated with a third frequency and a fourth frequency, where the third frequency is greater than or equal to the first frequency, and where the fourth frequency is less than or equal to the second frequency. In one aspect, to facilitate coexistence of a 5G NR initial DL BWP configuration for the UE 802 with the initial DL BWP configuration (e.g., the 6G initial DL BWP) described above, the base station 804 may explicitly indicate the initial DL BWP to the UE 802 through system information (SI).

The UE 802 may perform a WB channel FMCW based channel estimation (e.g., VCO FMCW based channel estimation as described above in the description of FIG. 6). The UE may select a WB SSB (e.g., a WB SSB as in the first example 702, the second example 710, and/or the third example 712) and a suitable subband associated with the initial DL BWP before selecting a preamble for transmission (e.g., before selecting a preamble that is transmitted at 808 or at 818 as part of the msgA). With more particularity, the base station 804 may transmit a plurality of WB SSBs. The UE 802 may measure each of the plurality of WB SSBs. For instance, the UE 802 may perform a reference signal received power (RSRP) measurement on each of the WB SSBs. The UE 802 may select a WB SSB in the plurality of WB SSBs based on the RSRP measurements for each of the plurality of WB SSBs. The UE 802 may select a suitable subband based on the selected WB SSB. The UE 802 may transmit a preamble (e.g., the preamble transmitted at 808 or at 818) using the suitable subband. The UE may also detect a MIB and/or a SIB on a beam associated with the selected WB SSB. The UE 802 may utilize information in the detected MIB and/or the detected SIB to facilitate a RACH procedure (e.g., the four-step RACH procedure 806 or the two-step RACH procedure 816).

In an aspect in which the two-step RACH procedure 816 is supported, the UE 802 may select (i.e., choose) both a msgA RACH occasion (RO) and a msgA PUSCH occasion in one or more suitable subbands associated with the initial DL BWP. A RO may refer to an area specified in a time domain and a frequency domain that is available for a reception of a preamble. The UE 802 may transmit the msgA at 818 based on the selected msgA RO and the selected msgA PUSCH occasion in the one or more suitable subbands.

In an aspect in which the two-step RACH procedure 816 is supported, the UE 802 may measure CSI for each of a set of subbands associated with the initial DL BWP. The UE 802 may include indication(s) of the measured CSI in a msgA PUSCH transmission to facilitate a DL coverage enhancement for msgB (e.g., the msgB transmitted by the base station 804 at 820) and/or the to facilitate a DL coverage enhancement for a RAR (e.g., the RAR transmitted by the base station 804 at 810).

In one aspect, the UE 802 may utilized enhanced subband frequency hopping (FH) for a PDCCH reception and/or a PDSCH reception. For instance, a network (e.g., the base station 804) may configure multiple subbands for FH based on the measured CSI reported by the UE 802, where the CSI may be derived through FMCW measurement(s).

As described above, the base station 804 may transmit a plurality of WB SSBs. FIG. 8 further depicts a diagram 822 that illustrates a plurality of SSBs (e.g., WB SSBs). Subsets of the plurality of SSBs may be associated with different ROs. For instance, the diagram 822 illustrates RO 0, where RO 0 may be associated with SSBs 0-7, RO 1, where RO 1 may be associated with SSBs 8-15, RO 2, where RO 2 may be associated with SSBs 16-23, etc. As illustrated in the diagram 822, each RO may be separated in a time domain and/or in a frequency domain from other ROs. Each SSB in a RO (e.g., RO 0) may also be separated in the time domain and/or the frequency domain from other SSBs in the RO.

Figure 9:
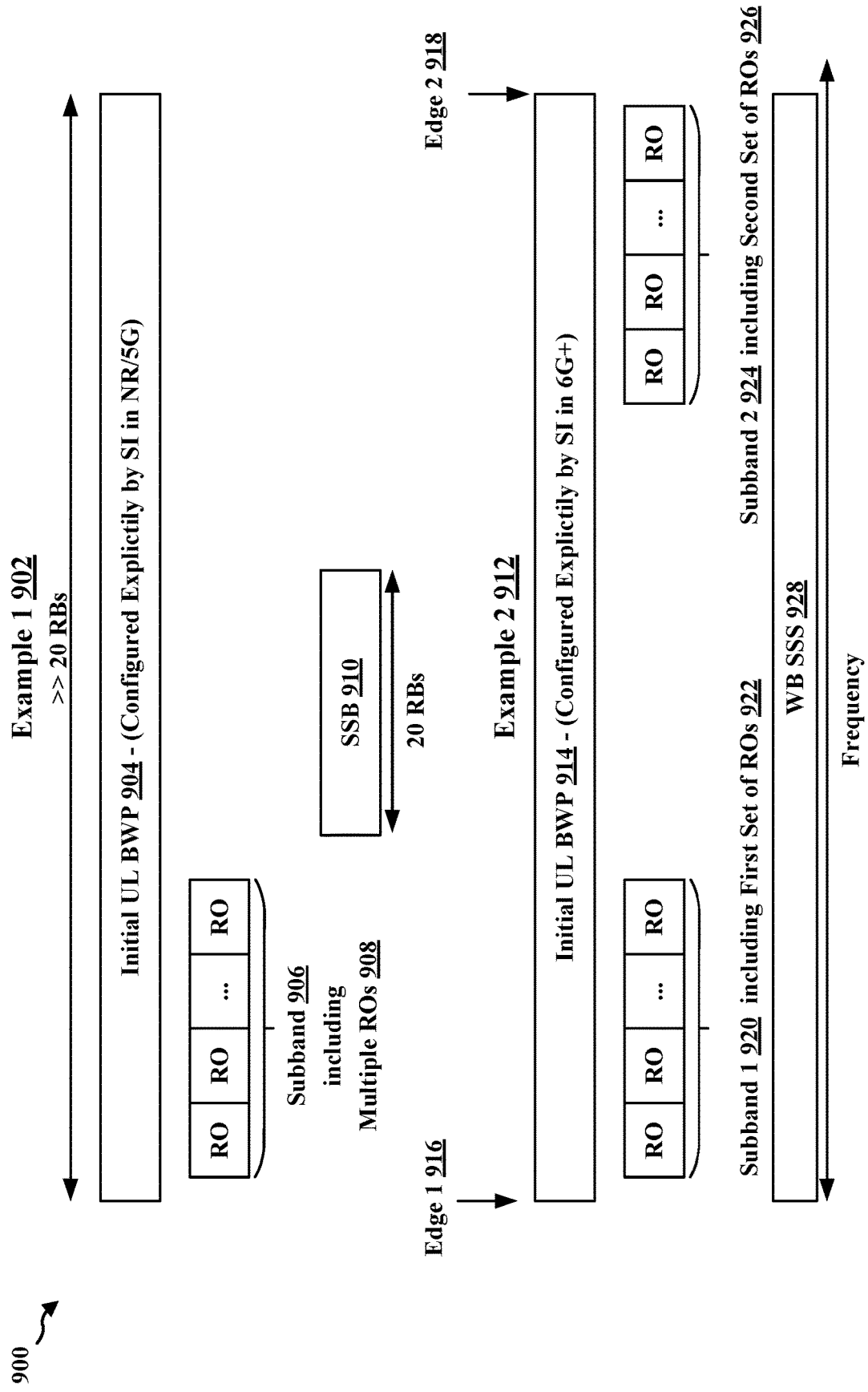
FIG. 9 is a diagram illustrating example aspects pertaining to 5G NR RACH occasions (ROs) and 6G ROs.

FIG. 9 is a diagram 900 illustrating example aspects pertaining to 5G NR ROs and 6G ROs. A RO may be pre-configured (i.e., reserved) by a network (e.g., the base station 804). A RO may not be utilized by other UL channels (e.g., a PUSCH, a PUCCH) even if the RO is not selected by a UE for a preamble transmission. In order to increase frequency diversity and to reduce UL resource fragmentation for 5G NR UEs and 6G UEs, RO resources for 6G UEs may be configured on two subbands at an edge of an initial UL BWP.

In a first example 902 associated with a 5G NR wireless communication system, a base station (e.g., the base station 804) may configure (e.g., explicitly configure) an initial UL BWP 904 for a UE (e.g., the UE 802) via SI. The initial UL BWP 904 may span a number of resource blocks (RBs) that is greater than (or much greater than) 20 RBs. The initial UL BWP 904 may encompass a subband 906, where the subband 906 may include multiple ROs 908. The initial UL BWP 904 may also encompass an SSB 910, where the SSB 910 may span 20 RBs.

In a second example 912 associated with a 6G wireless communication system (or another wireless communication system), a base station (e.g., the base station 804) may configure (e.g., explicitly configure) an initial UL BWP 914 for a UE (e.g., the UE 802) via SI, that is, the base station may transmit the SI to the UE which configures the initial UL BWP 914. The initial UL BWP 914 may be an initial UL WB BWP. The initial UL BWP 914 may be associated with a first edge 916 associated with a first frequency and a second edge 918 associated with a second frequency, where the first frequency and the second frequency may be different. The initial UL BWP 914 may encompass a first subband 920, where the first subband 920 may include a first set of ROs 922, where the first set of ROs 922 may include first multiple ROs. The initial UL BWP 914 may also encompass a second subband 924, where the second subband 924 may include a second set of ROs 926, where the second set of ROs 926 may include second multiple ROs. The first subband 920 may be associated with the first edge 916 of the initial UL BWP 914 and the second subband 924 may be associated with the second edge 918 of the initial UL BWP 914. In an example, the base station may map the first subband 920 to the first edge 916 and the base station may map the second subband 924 to the second edge 918. For instance, the first subband 920 may be mapped to or near the first edge 916 in a frequency domain and the second subband 924 may be mapped to or near the second edge 918 in the frequency domain. The first set of ROs 922 may be shared by both 5G NR UEs and 6G UEs, that is, both 5G NR UEs and 6G UEs may select one or more ROs in the first set of ROs 922 for preamble transmission(s). The first set of ROs may share a subset of PRACH slots. The second set of ROs 926 may be separately configured for 6G UEs and may not be used by 5G UEs. The second set of ROs 926 may be separately configured for 6G UEs on a subset of PRACH slots, which may be different from PRACH slots configured for 5G UEs. A 6G UE may select a RO in the first set of ROs 922 or the second set of ROs 926 based on a channel sounding outcome (e.g., a measurement) performed on a WB SSS 928 (e.g., the SSS 708) encompassed by the initial UL BWP 914. In one aspect, the second subband 924 may be larger than the first subband 920, that is, the second subband 924 may encompass a frequency range that is greater than a frequency range encompassed by the first subband 920. As illustrated in FIG. 9, the initial UL BWP 914 may cover at least the WB SSS 928 (and hence a WB SSB associated with the WB SSS 928), the first subband 920, and the second subband 924.

Figure 10:
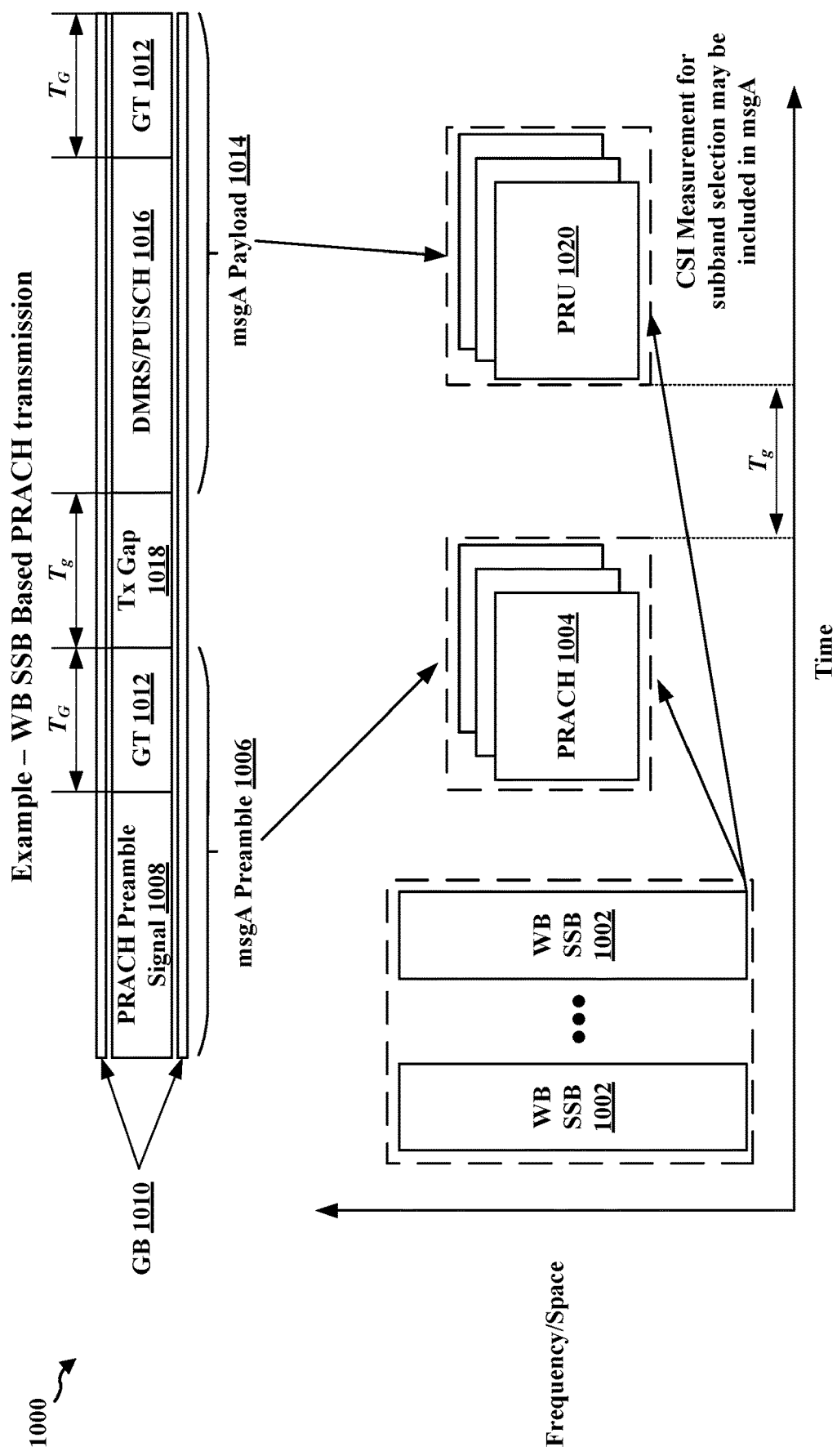
FIG. 10 is a diagram illustrating example aspects of physical random access channel (PRACH) transmission.

FIG. 10 is a diagram 1000 illustrating example aspects of physical random access channel (PRACH) transmission. A UE (e.g., the UE 802) may perform measurement(s) on WB SSB(s) 1002 (e.g., a WB SSB as in the first example 702, the second example 710, and/or the third example 712). The UE may select a PRACH 1004 (i.e., a preamble) based on the measurement(s) performed on the WB SSB(s) 1002.

In one aspect, the PRACH 1004 may be a msgA that may include a msgA preamble 1006. In an example, the msgA may be the msgA transmitted at 818. The msgA preamble 1006 may include a PRACH preamble signal 1008. The msgA may include a guard band (GB) 1010 on each side (in the frequency domain) of the msgA preamble 1006. The msgA preamble 1006 may include a guard time (GT) 1012 that follows the PRACH preamble signal 1008 in the time domain. The GB 1010 may also enclose (in the frequency domain) the GT 1012. The GT 1012 may also be referred to as $T_G$.

As indicated above, in one aspect, the UE may perform CSI measurements. The UE may transmit CSI measurement reports that include the CSI measurements in the msgA. For instance, the msgA may also include a msgA payload 1014. The msgA payload 1014 may include a demodulation reference signal (DMRS)/PUSCH transmission 1016. The msgA payload 1014 may be located after the msgA preamble 1006 in the time domain. A Tx gap 1018 may separate the msgA preamble 1006 and the msgA payload 1014 in the time domain. The Tx gap 1018 may also be referred to as $T_g$. The DMRS/PUSCH transmission 1016 may be followed by a GT 1012 in the time domain. The DMRS/PUSCH transmission 1016 may be associated with a PUSCH resource unit (PRU 1020). The PRU 1020 may enable a one-to-one and/or a multiple-to-one mapping between the PRU 1020 and preambles.

Figure 11:
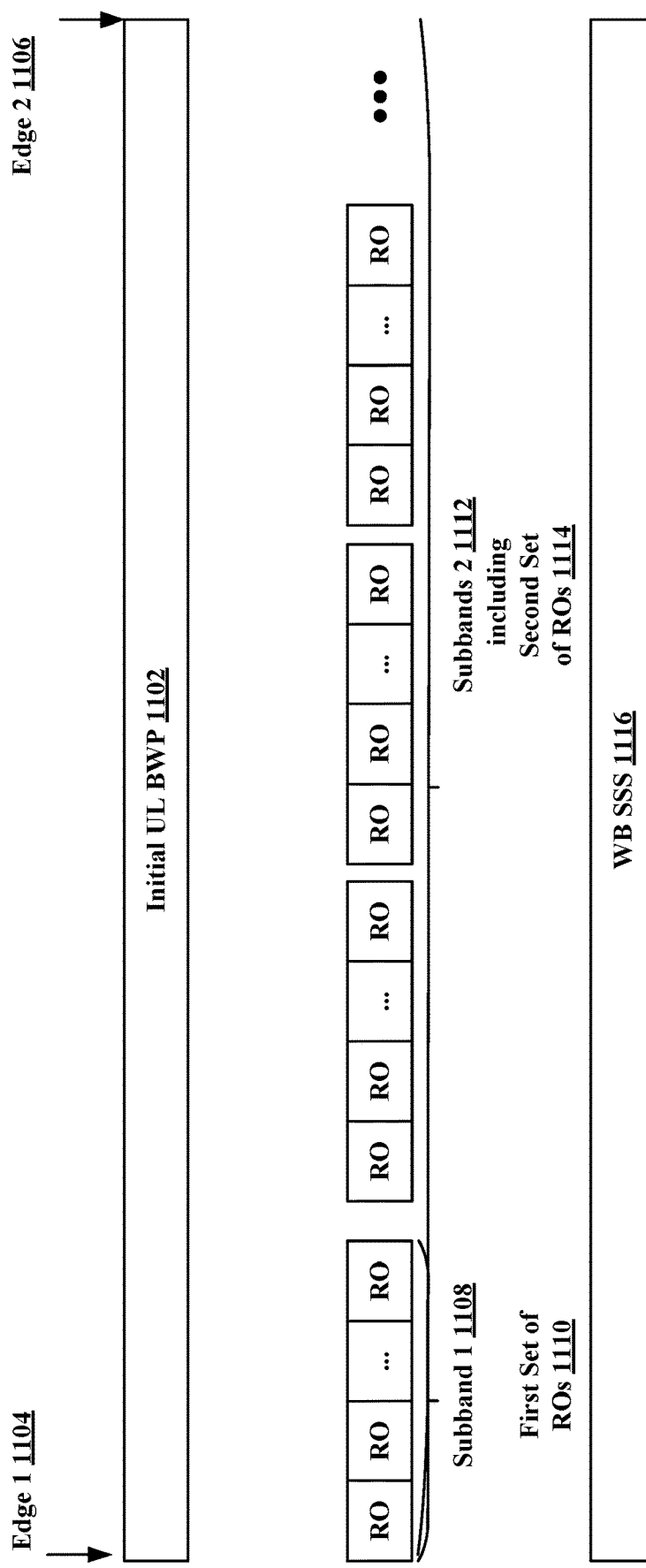
FIG. 11 is a diagram illustrating example random access channel (RACH) enhancements based on FMCW channel sounding.

FIG. 11 is a diagram 1100 illustrating example random access channel (RACH) enhancements based on FMCW channel sounding. A base station (e.g., the base station 804) may configure (e.g., explicitly configure) an initial UL BWP 1102 for a UE (e.g., the UE 802) via SI, that is, the base station may transmit the SI to the UE which may configure the initial UL BWP 1102. The initial UL BWP 1102 may be an initial UL WB BWP. The initial UL BWP 1102 may be associated with a first edge 1104 associated with a first frequency and a second edge 1106 associated with a second frequency, where the first frequency and the second frequency may be different. The initial UL BWP 1102 may encompass a first subband 1108, where the first subband 1108 may include a first set of ROs 1110, where the first set of ROs 1110 may include first multiple ROs. The first subband 1108 may be associated with the first edge 1104 of the initial UL BWP 914 (or the second edge 1106). The first set of ROs 1110 may be used by 5G NR UEs, that is, a 5G NR UE may select a RO in the first set of ROs 1110 for a preamble transmission (or a msgA transmission). The first set of ROs 1110 may also be used by 6G UEs (or UEs using another wireless communication system).

The initial UL BWP 1102 may also encompass second subbands 1112, where the second subbands 1112 may include second sets of ROs 1114, where each set in the second sets of ROs 1114 may include multiple ROs. The second subbands 1112 may also include the first subband 1108. The second sets of ROs 1114 may be used by 6G UEs (or UEs using another wireless communication system), that is, a 6G UE may select a set of ROs in the second sets of ROs 1114 (or in the first set of ROs 1110) and the UE may select a RO in the selected set for a preamble transmission (or a msgA transmission) based on a WB FMCW measurement. The second subbands 1112 may be configured by the base station. As illustrated in FIG. 11, the initial UL BWP 1102 may cover at least a WB SSS 1116 (and hence a WB SSB associated with the WB SSS 1116), the first subband 1108, and the second subbands 1112.

In one aspect, each subband in the second subbands 1112 may be associated with a subband for a msgA transmission (i.e., a msgA PUSCH transmission) or a msg3 transmission (i.e., a msg3 PUSCH transmission). In another aspect, each RO of the second subbands 1112 may be associated with a specific subband for a msgA transmission (i.e., a msgA PUSCH transmission) or a msg3 transmission (i.e., a msg3 PUSCH transmission).

A RACH procedure may be enhanced in various manners. In one aspect, if a UE transmits a msgA PUSCH transmission or a msg3 PUSCH transmission with an associated RO or an associated subband for the RO, a network (e.g., the base station 804) may assume that the UE has identified a suitable subband for the msgA PUSCH transmission or the msg3 PUSCH transmission. The network may schedule the suitable subband for a RAR, a msg4 reception, and/or a msgB reception. In another aspect, the UE may explicitly indicate a RO selected by a WB FMCW measurement. For instance, the UE may transmit an indication of the selected RO to the network. The network may schedule a subband associated with the RO for a msg3 PUSCH transmission, a RAR, a msg4 reception, and/or a msgB reception.

Figure 12:
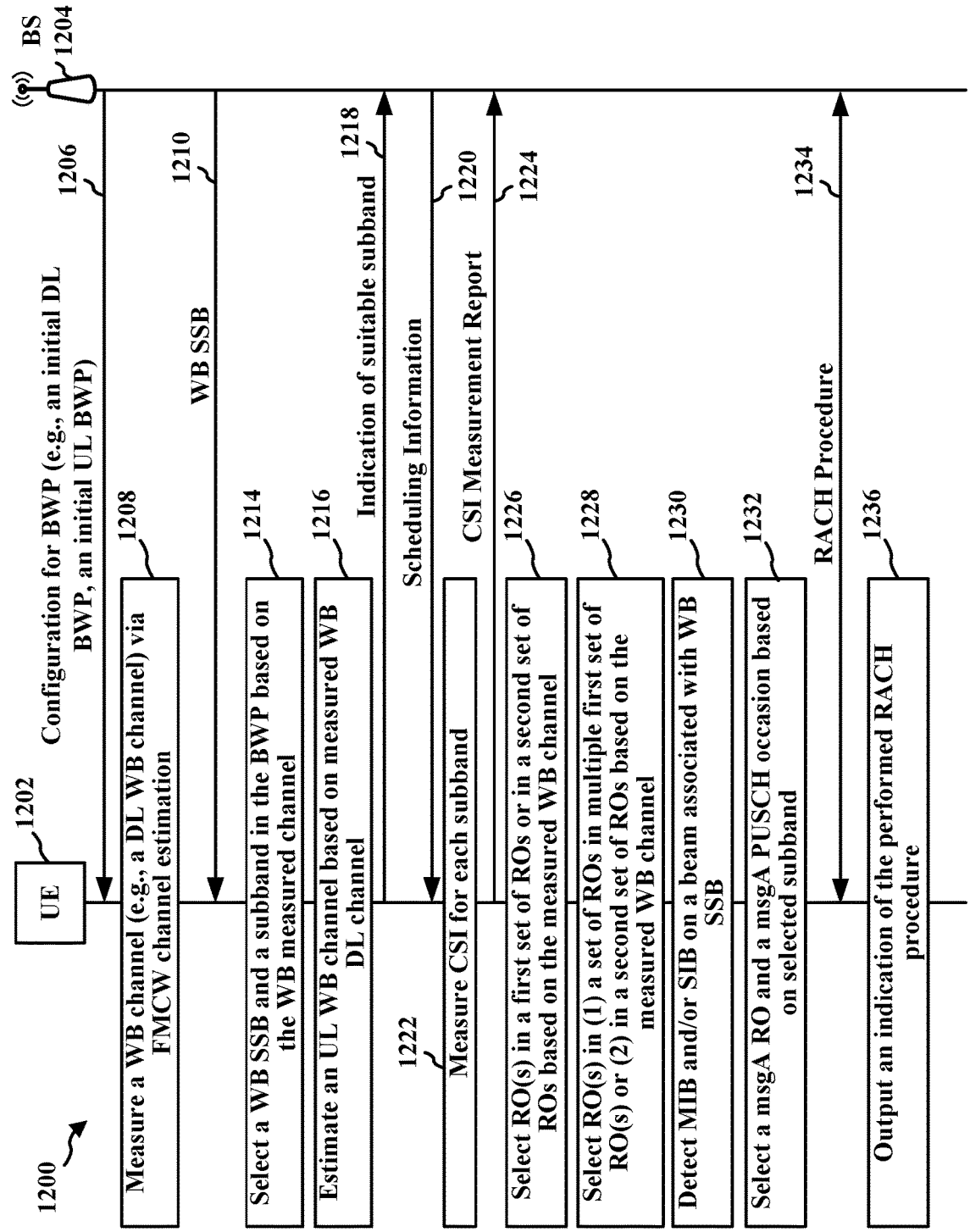
FIG. 12 is a diagram illustrating example communications between a UE and a base station.

FIG. 12 is a diagram 1200 illustrating example communications between a UE 1202 and a base station 1204. In an example, the UE 1202 may be or include the UE 104, the UE 350, the UE 604, the UE 802, etc. In an example, the base station 1204 may be or include the base station 102, the base station 310, the base station 602, the base station 804, etc.

At 1208, the UE 1202 may measure a wideband (WB) channel via frequency modulated continuous wave (FMCW) channel estimation. At 1214, the UE 1202 may select a WB synchronization signal block (SSB) and a subband in a bandwidth part (BWP) based on the measured WB channel. At 1234, the UE 1202 may perform a random access channel (RACH) procedure based on the WB SSB and the subband in the BWP. At 1236, the UE 1202 may output an indication of the performed RACH procedure based on the WB SSB and the subband in the BWP.

In one aspect, the WB channel may be a downlink (DL) WB channel, and measuring the WB channel at 1208 may include measuring the DL WB channel via the FMCW channel estimation. In such an aspect, at 1216, the UE 1202 may estimate, based on the measured DL WB channel, an uplink (UL) WB channel.

In one aspect, the subband in the BWP may be included in a set of subbands in the BWP, and at 1218, the UE 1202 may transmit, based on the measured DL WB channel at 1208, an indication of a suitable subband in the set of subbands in the BWP, where performing the RACH procedure at 1234 may include performing the RACH procedure further based on the indication of the suitable subband. At 1220, the UE may receive, based on the transmitted indication of the suitable subband, scheduling information configured to schedule at least one an uplink (UL) transmission or a downlink (DL) transmission for the suitable subband, where the UL transmission and the DL transmission may be associated with the RACH procedure.

In one aspect, at 1222, the UE 1202 may measure, based on the measured DL WB channel, channel state information (CSI) for each of the set of subbands in the BWP. At 1224, the UE 1202 may transmit a CSI measurement report based on the measured CSI for each of the set of subbands in the BWP, where performing the RACH procedure at 1234 may include performing the RACH procedure further based at least in part on the CSI measurement report.

At 1206, the UE 1202 may receive a configuration associated with the BWP, where the BWP may encompass a frequency range of the WB SSB, and where measuring the WB channel at 1208 may include measuring the WB channel further based on the configuration.

In one aspect, the configuration associated with the BWP may configure a first set of RACH occasions (ROs) encompassed by the BWP and a second set of ROs encompassed by the BWP, where the subband may be a first subband, where the first set of ROs may be associated with the first subband and the second set of ROs may be associated with a second subband in the BWP, and at 1226, the UE 1202 may select at least one RO in the first set of ROs or in the second set of ROs based on the measured WB channel, where performing the RACH procedure at 1234 may include performing the RACH procedure further based on the at least one selected RO.

In one aspect, the subband may be a first subband, where the BWP may include multiple subbands that include the first subband, where the configuration associated with the BWP may configure multiple first sets of RACH occasions (ROs) encompassed by the BWP and a second set of ROs encompassed by the BWP, where the multiple first sets of ROs may be associated with the multiple subbands and the second set of ROs may be associated with the first subband, and at 1228, the UE 1202 may select at least one RO (1) in a set of ROs in the multiple first sets of ROs or (2) in the second set of ROs based on the measured WB channel, where performing the RACH procedure at 1234 may include performing the RACH procedure further based on the at least one selected RO.

At 1230, the UE 1202 may detect at least one of a master information block (MIB) or a system information block (SIB) on a beam associated with the WB SSB, where performing the RACH procedure at 1234 may include performing the RACH procedure further based on at least one of the detected MIB or the detected SIB. In one aspect, at 1232, the UE 1202 may select a message A (msgA) RACH occasion (RO) and a msgA physical uplink shared channel (PUSCH) occasion based on the selected subband.

At 1210, the base station 1204 may transmit a wideband (WB) synchronization signal block (SSB), where the WB SSB may be associated with a bandwidth part (BWP) and a subband in the BWP. At 1234, the base station 1204 may perform a random access channel (RACH) procedure based on the WB SSB, where the RACH procedure is associated with a WB channel, and where the WB channel is associated with frequency modulated continuous wave (FMCW) channel estimation. At 1218, the base station 1204 may receive an indication of a suitable subband in the set of subbands in the BWP, where performing the RACH procedure at 1234 may include performing the RACH procedure further based on the indication of the suitable subband. At 1220, the base station 1204 may transmit, based on the received indication of the suitable subband, scheduling information configured to schedule at least one an uplink (UL) transmission or a downlink (DL) transmission for the suitable subband, where the UL transmission and the DL transmission are associated with the RACH procedure. In one aspect, the subband of the BWP may be included in a set of subbands in the BWP, and at 1224, the base station 1204 may receive a channel state information (CSI) measurement reported based on the WB SSB, where performing the RACH procedure at 1234 may include performing the RACH procedure further based at least in part on the CSI measurement report. At 1206, the base station 1204 may transmit a configuration associated with the BWP, where the BWP encompasses a frequency range of the WB SSB, and performing the RACH procedure at 1234 may include performing the RACH procedure further based on the configuration.

Figure 13:
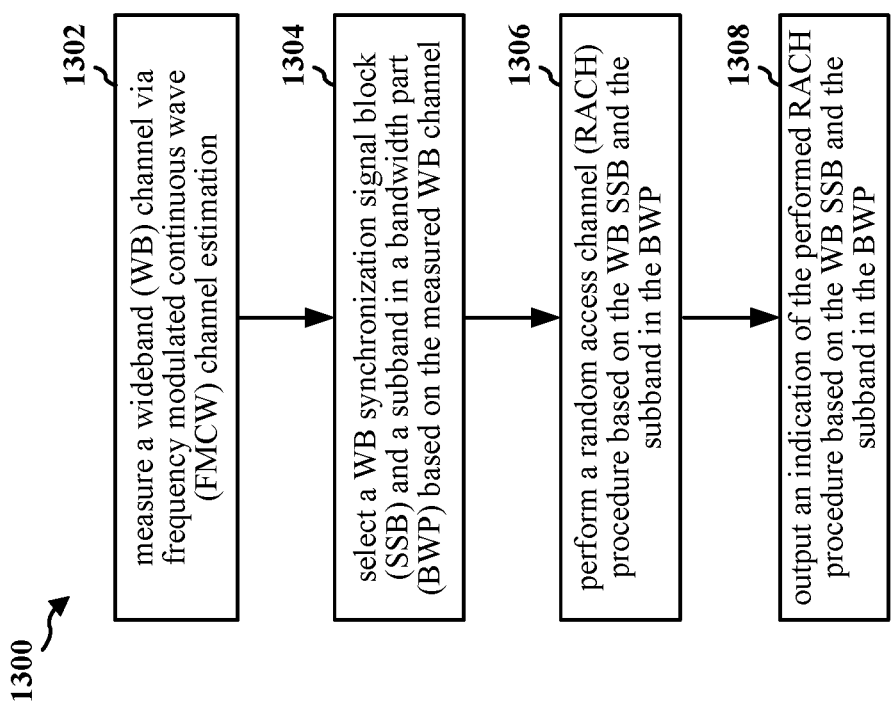
FIG. 13 is a flowchart of a method of wireless communication.

FIG. 13 is a flowchart 1300 of a method of wireless communication. The method may be performed by a UE (e.g., the UE 104, the UE 350, the UE 604, the UE 802, the UE 1202, the apparatus 1704). The method may be associated with various advantages at the UE, such as enabling a RACH procedure to be performed based on a channel estimated in one shot. In an example, the method may be performed by the FMCW component 198.

At 1302, the UE measures a wideband (WB) channel via frequency modulated continuous wave (FMCW) channel estimation. For example, FIG. 12 at 1208 shows that the UE 1202 may measure a wideband (WB) channel via frequency modulated continuous wave (FMCW) channel estimation. In an example, the FMCW channel estimation may include aspects described above in connection with FIGS. 4-6. In an example, 1302 may be performed by the FMCW component 198.

At 1304, the UE selects a WB synchronization signal block (SSB) and a subband in a bandwidth part (BWP) based on the measured WB channel. For example, FIG. 12 at 1214 shows that the UE 1202 may select a WB synchronization signal block (SSB) and a subband in a bandwidth part (BWP) based on the measured WB channel. In an example, the WB SSB may be or include the WB SSB in the first example 702, the second example 710, and/or the third example 712 in FIG. 7. In an example, the WB SSB may be or include the WB SSB(s) 1002. In an example, the subband may be the second subband 924 or a subband in the second subbands 1112. In an example, the WB SSB may be one or more of the SSBs illustrated in the diagram 822. In an example, the BWP may be associated with the initial UL BWP 914 and/or the initial UL BWP 1102. In an example, 1304 may be performed by the FMCW component 198.

At 1306, the UE performs a random access channel (RACH) procedure based on the WB SSB and the subband in the BWP. For example, FIG. 12 at 1234 shows that the UE 1202 may perform a random access channel (RACH) procedure based on the WB SSB and the subband in the BWP. Performing the RACH procedure may include aspects described above in connection with the four-step RACH procedure 806 and/or the two-step RACH procedure 816. In an example, 1306 may be performed by the FMCW component 198.

At 1308, the UE outputs an indication of the performed RACH procedure based on the WB SSB and the subband in the BWP. For example, FIG. 12 at 1236 shows that the UE 1202 may output an indication of the performed RACH procedure based on the WB SSB and the subband in the BWP. In an example, 1308 may be performed by the FMCW component 198.

Figure 14:
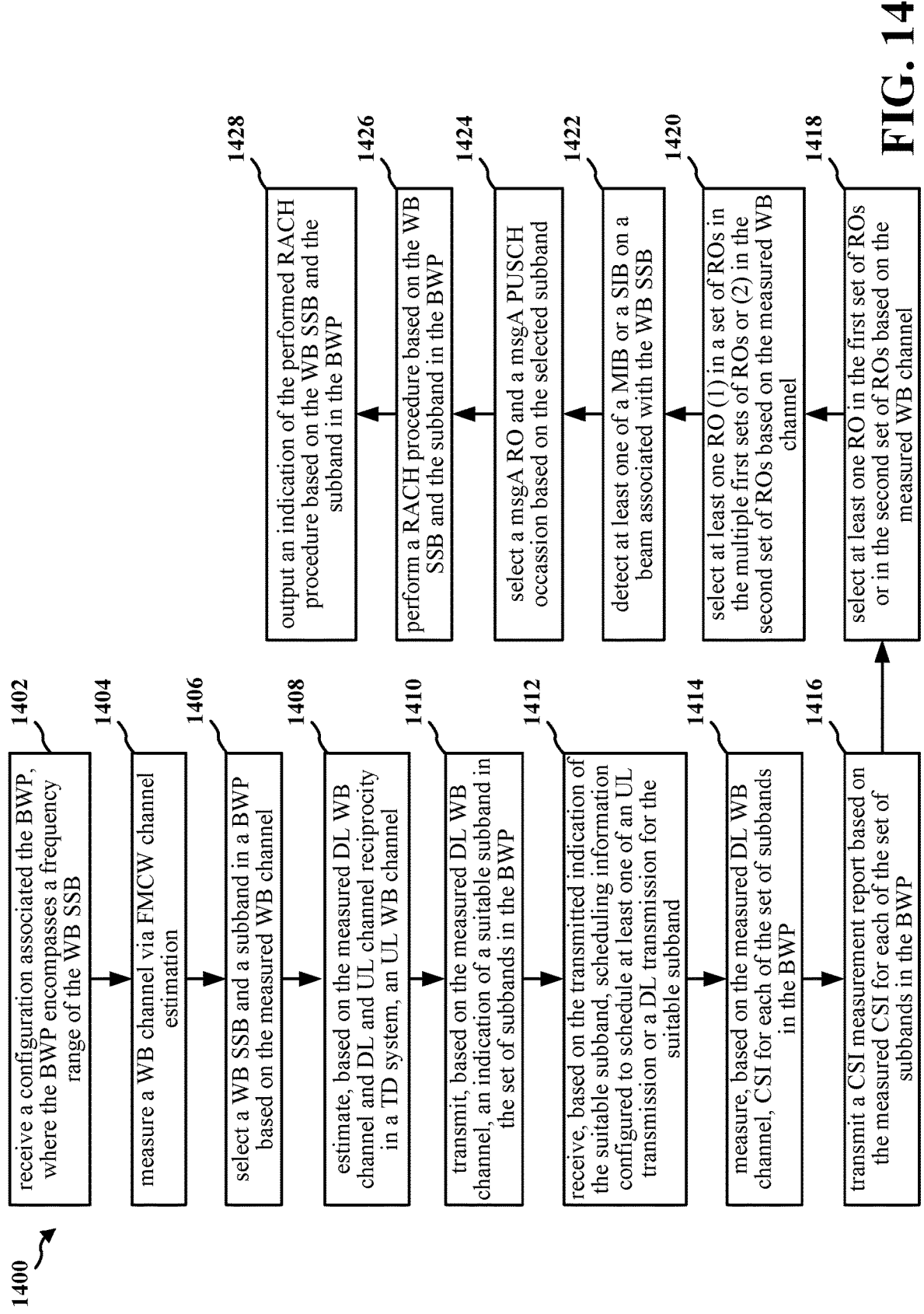
FIG. 14 is a flowchart of a method of wireless communication.

FIG. 14 is a flowchart 1400 of a method of wireless communication. The method may be performed by a UE (e.g., the UE 104, the UE 350, the UE 604, the UE 802, the UE 1202, the apparatus 1704). The method may be associated with various advantages at the UE, such as enabling a RACH procedure to be performed based on a channel estimated in one shot. In an example, the method (including the various aspects detailed below) may be performed by the FMCW component 198.

At 1404, the UE measures a wideband (WB) channel via frequency modulated continuous wave (FMCW) channel estimation. For example, FIG. 12 at 1208 shows that the UE 1202 may measure a wideband (WB) channel via frequency modulated continuous wave (FMCW) channel estimation. In an example, the FMCW channel estimation may include aspects described above in connection with FIGS. 4-6. In an example, 1404 may be performed by the FMCW component 198.

At 1406, the UE selects a WB synchronization signal block (SSB) and a subband in a bandwidth part (BWP) based on the measured WB channel. For example, FIG. 12 at 1214 shows that the UE 1202 may select a WB synchronization signal block (SSB) and a subband in a bandwidth part (BWP) based on the measured WB channel. In an example, the WB SSB may be or include the WB SSB in the first example 702, the second example 710, and/or the third example 712 in FIG. 7. In an example, the WB SSB may be or include the WB SSB(s) 1002. In an example, the subband may be the second subband 924 or a subband in the second subbands 1112. In an example, the WB SSB may be one or more of the SSBs illustrated in the diagram 822. In an example, the BWP may be associated with the initial UL BWP 914 and/or the initial UL BWP 1102. In an example, 1406 may be performed by the FMCW component 198.

At 1426, the UE performs a random access channel (RACH) procedure based on the WB SSB and the subband in the BWP. For example, FIG. 12 at 1234 shows that the UE 1202 may perform a random access channel (RACH) procedure based on the WB SSB and the subband in the BWP. Performing the RACH procedure may include aspects described above in connection with the four-step RACH procedure 806 and/or the two-step RACH procedure 816. In an example, 1426 may be performed by the FMCW component 198.

At 1428, the UE outputs an indication of the performed RACH procedure based on the WB SSB and the subband in the BWP. For example, FIG. 12 at 1236 shows that the UE 1202 may output an indication of the performed RACH procedure based on the WB SSB and the subband in the BWP. In an example, 1428 may be performed by the FMCW component 198.

In one aspect, outputting the indication of the performed RACH procedure may include: transmitting the indication of the performed RACH procedure based on the WB SSB and the subband in the BWP; or storing the indication of the performed RACH procedure based on the WB SSB and the subband in the BWP. For example, outputting the indication of the performed RACH procedure at 1236 may include transmitting the indication of the performed RACH procedure based on the WB SSB and the subband in the BWP; or storing the indication of the performed RACH procedure based on the WB SSB and the subband in the BWP.

In one aspect, the WB channel may be a downlink (DL) WB channel, and measuring the WB channel via the FMCW channel estimation may include: measuring the DL WB channel via the FMCW channel estimation. For example, FIG. 12 at 1208 shows that the WB channel may be a DL WB channel. For example, measuring the WB channel via the FMCW channel estimation at 1208 may include measuring the DL WB channel via the FMCW channel estimation. FMCW channel estimation may include aspects described above in connection with FIGS. 4-6.

In one aspect, at 1408, the UE may estimate, based on the measured DL WB channel and DL and uplink (UL) channel reciprocity in a time division duplex (TDD) system, an UL WB channel. For example, FIG. 12 at 1216 shows that the UE 1202 may estimate, based on the measured DL WB channel and DL and uplink (UL) channel reciprocity in a time division duplex (TDD) system, an UL WB channel. In an example, 1408 may be performed by the FMCW component 198.

In one aspect, the subband in the BWP may be included in a set of subbands in the BWP, and at 1410, the UE may transmit, based on the measured DL WB channel, an indication of a suitable subband in the set of subbands in the BWP, where performing the RACH procedure may include performing the RACH procedure further based on the indication of the suitable subband. For example, FIG. 12 at 1218 shows that the UE 1202 may transmit, based on the measured DL WB channel, an indication of a suitable subband in the set of subbands in the BWP, where performing the RACH procedure may include performing the RACH procedure at 1234 further based on the indication of the suitable subband. In an example, 1410 may be performed by the FMCW component 198.

In one aspect, at 1412, the UE may receive, based on the transmitted indication of the suitable subband, scheduling information configured to schedule at least one of an uplink (UL) transmission or a downlink (DL) transmission for the suitable subband, where the UL transmission and the DL transmission may be associated with the RACH procedure. For example, FIG. 12 at 1220 shows that the UE 1202 may receive, based on the transmitted indication of the suitable subband, scheduling information configured to schedule at least one of an uplink (UL) transmission or a downlink (DL) transmission for the suitable subband, where the UL transmission and the DL transmission may be associated with the RACH procedure. In an example, the UL transmission may be the msg3 transmission at 812. In an example, the DL transmission may be the RAR at 810, the msg4 transmission at 814, or the msgB transmission at 820. In an example, 1412 may be performed by the FMCW component 198.

In one aspect, the subband of the BWP may be included in a set of subbands in the BWP, and at 1414, the UE may measure, based on the measured DL WB channel, channel state information (CSI) for each of the set of subbands in the BWP. For example, FIG. 12 at 1222 shows that the UE 1202 may measure, based on the measured DL WB channel, channel state information (CSI) for each of the set of subbands in the BWP. The aforementioned aspect may correspond to the description of FIG. 10. In an example, 1414 may be performed by the FMCW component 198.

In one aspect, the subband of the BWP may be included in a set of subbands in the BWP, and at 1416, the UE may transmit a CSI measurement report based on the measured CSI for each of the set of subbands in the BWP, where performing the RACH procedure may include performing the RACH procedure further based at least in part on the CSI measurement report. For example, FIG. 12 at 1224 shows that the UE 1202 may transmit a CSI measurement report based on the measured CSI for each of the set of subbands in the BWP, where performing the RACH procedure at 1234 may include performing the RACH procedure further based at least in part on the CSI measurement report. The aforementioned aspect may correspond to the description of FIG. 10. In an example, 1416 may be performed by the FMCW component 198.

In one aspect, at 1402, the UE may receive a configuration associated with the BWP, where the BWP may encompass a frequency range of the WB SSB, and where measuring the WB channel may include measuring the WB channel further based on the configuration. For example, FIG. 12 at 1206 shows that the UE 1202 may receive a configuration associated with the BWP, where the BWP may encompass a frequency range of the WB SSB, and where measuring the WB channel at 1208 may include measuring the WB channel further based on the configuration. In another example, FIG. 9 shows that the initial UL BWP 914 may encompass a frequency range of the WB SSS 928 (and hence a WB SSB). In an example, 1402 may be performed by the FMCW component 198.

In one aspect, the configuration associated with the BWP may configure a first set of RACH occasions (ROs) encompassed by the BWP and a second set of ROs encompassed by the BWP, where the subband may be a first subband, where the first set of ROs may be associated with the first subband and the second set of ROs may be associated with a second subband in the BWP, and at 1418, the UE may select at least one RO in the first set of ROs or in the second set of ROs based on the measured WB channel, where performing the RACH procedure may include performing the RACH procedure further based on the at least one selected RO. For example, FIG. 12 at 1226 shows that the UE 1202 may select at least one RO in the first set of ROs or in the second set of ROs based on the measured WB channel, where performing the RACH procedure at 1234 may include performing the RACH procedure further based on the at least one selected RO. In an example, the first set of ROs may be or include the second set of ROs 926 and the second set of ROs may be the first set of ROs 922. In an example, the first subband may be or include the second subband 924 and the second subband may be or include the first subband 920. In an example, 1418 may be performed by the FMCW component 198.

In one aspect, the BWP may be associated with a first edge corresponding to a first frequency and a second edge corresponding to a second frequency, where the first subband may be associated with the first edge, and where the second subband may be associated with the second frequency. For example, the first edge may be the first edge 916 and the second edge may be the second edge 918, where the first edge 916 maybe associated with a first frequency and the second edge 918 may be associated with a second frequency. In an example, FIG. 9 shows that the first subband 920 may be associated with the first edge 916 and the second subband 924 may be associated with the second edge 918.

In one aspect, the first subband may be associated with a first frequency range and the second subband is associated with a second frequency range, where the first frequency range may be greater than the second frequency range. For example, the first subband 920 may be larger than the second subband 924.

In one aspect, the subband may be a first subband, where the BWP may include multiple subbands that include the first subband, where the configuration associated with the BWP may configure multiple first sets of RACH occasions (ROs) encompassed by the BWP and a second set of ROs encompassed by the BWP, where the multiple first sets of ROs may be associated with the multiple subbands and the second set of ROs may be associated with the first subband, and at 1420, the UE may select at least one RO (1) in a set of ROs in the multiple first sets of ROs or (2) in the second set of ROs based on the measured WB channel, where performing the RACH procedure may include performing the RACH procedure further based on the at least one selected RO. For example, FIG. 12 at 1228 shows that the UE 1202 may select at least one RO (1) in a set of ROs in the multiple first sets of ROs or (2) in the second set of ROs based on the measured WB channel, where performing the RACH procedure at 1234 may include performing the RACH procedure further based on the at least one selected RO. In an example, the multiple first sets of ROs may be the second sets of ROs 1114 and the second set of ROs may be the first set of ROs 1110. In an example, the selected at least one RO may be from a set in the second sets of ROs 1114 or from a set in the first set of ROs 1110. In an example, 1420 may be performed by the FMCW component 198.

In one aspect, at 1422, the UE may detect at least one of a master information block (MIB) or a system information block (SIB) on a beam associated with the WB SSB, where performing the RACH procedure may include performing the RACH procedure further based on at least one of the detected MIB or the detected SIB. For example, FIG. 12 at 1230 shows that the UE 1202 may detect at least one of a master information block (MIB) or a system information block (SIB) on a beam associated with the WB SSB, where performing the RACH procedure at 1234 may include performing the RACH procedure further based on at least one of the detected MIB or the detected SIB. In an example, 1422 may be performed by the FMCW component 198.

In one aspect, at 1424, the UE may select a message A (msgA) RACH occasion (RO) and a msgA physical uplink shared channel (PUSCH) occasion based on the selected subband. For example, FIG. 12 at 1232 shows that the UE 1202 may select a message A (msgA) RACH occasion (RO) and a msgA physical uplink shared channel (PUSCH) occasion based on the selected subband. The aforementioned aspect may correspond to the two-step RACH procedure 816. In an example, 1424 may be performed by the FMCW component 198.

In one aspect, the WB SSB may include a narrowband primary synchronization signal (PSS), at least one WB secondary synchronization signal (SSS), and physical broadcast channel (PBCH) data, and where measuring the WB channel via the FMCW channel estimation may include measuring the at least one WB SSS. For example, FIG. 7 shows that a WB SSB may include a PSS 704, (at least one) SSS 708, and PBCH data 706. Furthermore, measuring the WB channel via the FMCW channel estimation at 1208 may include measuring the at least one WB SSS.

Figure 15:
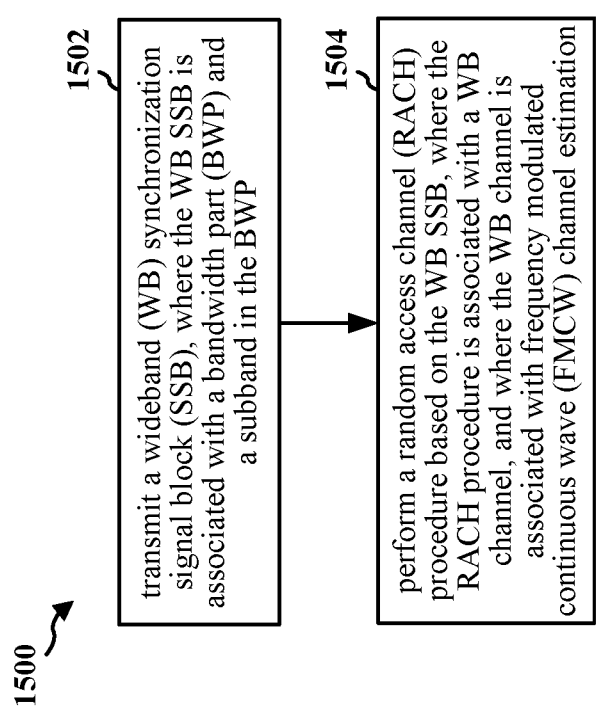
FIG. 15 is a flowchart of a method of wireless communication.

FIG. 15 is a flowchart 1500 of a method of wireless communication. The method may be performed by a network node (e.g., the base station 102, the base station 310, the base station 602, the base station 804, the base station 1204, the network entity 1702, the network entity 1802). The method may be associated with various advantages at the base station, such as enabling a RACH procedure to be performed based on a channel estimated in one shot. In an example, the method may be performed by the FMCW component 199.

At 1502, the network node transmits a wideband (WB) synchronization signal block (SSB), where the WB SSB is associated with a bandwidth part (BWP) and a subband in the BWP. For example, FIG. 12 at 1210 shows that the base station 1204 may transmits a wideband (WB) synchronization signal block (SSB), where the WB SSB may be associated with a bandwidth part (BWP) and a subband in the BWP. In an example, the WB SSB may be or include the WB SSB depicted in the first example 702, the second example 710, and/or the third example 712. In an example, the BWP may be associated with the initial UL BWP 914 and/or the initial UL BWP 1102. In an example, the subband may be or include the second subband 924 or a subband in the second subbands 1112. In an example, 1502 may be performed by the FMCW component 199.

At 1504, the network node performs a random access channel (RACH) procedure based on the WB SSB, where the RACH procedure is associated with a WB channel, and where the WB channel is associated with frequency modulated continuous wave (FMCW) channel estimation. For example, FIG. 12 at 1234 shows that the base station 1204 may perform a random access channel (RACH) procedure based on the WB SSB, where the RACH procedure may be associated with a WB channel, and where the WB channel may be associated with frequency modulated continuous wave (FMCW) channel estimation. Performing the RACH procedure may include aspects described above in connection with the four-step RACH procedure 806 and/or the two-step RACH procedure 816. In an example, the WB channel and the FMCW channel estimation may include aspects described above in connection with FIGS. 4-6. In an example, 1504 may be performed by the FMCW component 199.

Figure 16:
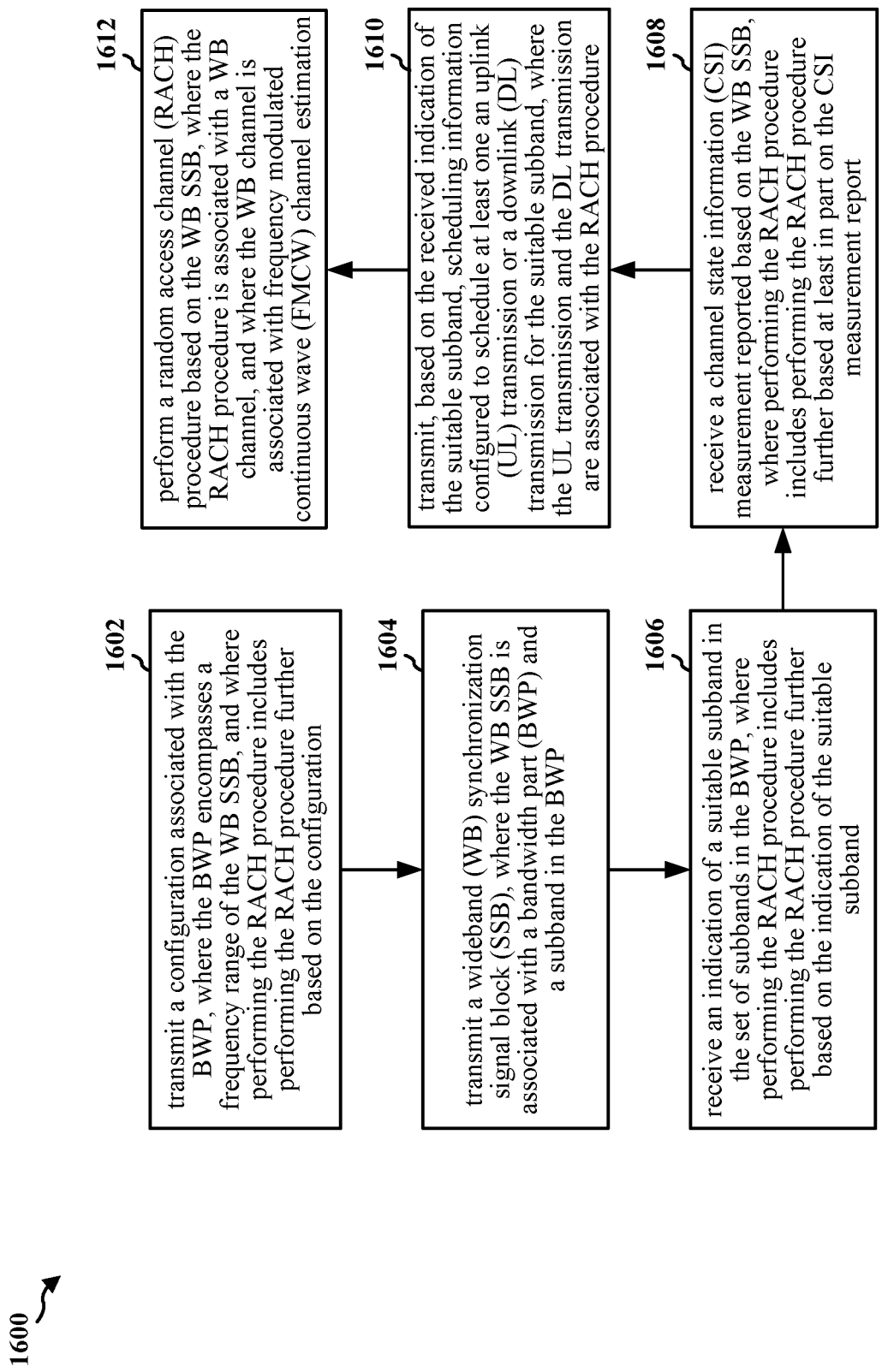
FIG. 16 is a flowchart of a method of wireless communication.

FIG. 16 is a flowchart 1600 of a method of wireless communication. The method may be performed by a network node (e.g., the base station 102, the base station 310, the base station 602, the base station 804, the base station 1204, the network entity 1702, the network entity 1802). The method may be associated with various advantages at the base station, such as enabling a RACH procedure to be performed based on a channel estimated in one shot. In an example, the method (including the various aspects detailed below) may be performed by the FMCW component 199.

At 1604, the network node transmits a wideband (WB) synchronization signal block (SSB), where the WB SSB is associated with a bandwidth part (BWP) and a subband in the BWP. For example, FIG. 12 at 1210 shows that the base station 1204 may transmits a wideband (WB) synchronization signal block (SSB), where the WB SSB may be associated with a bandwidth part (BWP) and a subband in the BWP. In an example, the WB SSB may be or include the WB SSB depicted in the first example 702, the second example 710, and/or the third example 712. In an example, the BWP may be associated with the initial UL BWP 914 and/or the initial UL BWP 1102. In an example, the subband may be or include the second subband 924 or a subband in the second subbands 1112. In an example, 1604 may be performed by the FMCW component 199.

At 1612, the network node performs a random access channel (RACH) procedure based on the WB SSB, where the RACH procedure is associated with a WB channel, and where the WB channel is associated with frequency modulated continuous wave (FMCW) channel estimation. For example, FIG. 12 at 1234 shows that the base station 1204 may perform a random access channel (RACH) procedure based on the WB SSB, where the RACH procedure may be associated with a WB channel, and where the WB channel may be associated with frequency modulated continuous wave (FMCW) channel estimation. Performing the RACH procedure may include aspects described above in connection with the four-step RACH procedure 806 and/or the two-step RACH procedure 816. In an example, the WB channel and the FMCW channel estimation may include aspects described above in connection with FIGS. 4-6. In an example, 1612 may be performed by the FMCW component 199.

In one aspect, the subband in the BWP may be included in a set of subbands in the BWP, and at 1606, the network node may receive an indication of a suitable subband in the set of subbands in the BWP, where performing the RACH procedure may include performing the RACH procedure further based on the indication of the suitable subband. For example, FIG. 12 at 1218 shows that the base station 1204 may receive an indication of a suitable subband in the set of subbands in the BWP, where performing the RACH procedure at 1234 may include performing the RACH procedure further based on the indication of the suitable subband. In an example, 1606 may be performed by the FMCW component 199.

In one aspect, at 1610, the network node may transmit, based on the received indication of the suitable subband, scheduling information configured to schedule at least one of an uplink (UL) transmission or a downlink (DL) transmission for the suitable subband, where the UL transmission and the DL transmission may be associated with the RACH procedure. For example, FIG. 12 at 1220 shows that the base station 1204 may transmit, based on the received indication of the suitable subband, scheduling information configured to schedule at least one of an uplink (UL) transmission or a downlink (DL) transmission for the suitable subband, where the UL transmission and the DL transmission may be associated with the RACH procedure. In an example, the UL transmission may be the msg3 transmission at 812. In an example, the DL transmission may be the RAR at 810, the msg4 transmission at 814, or the msgB transmission at 820. In an example, 1610 may be performed by the FMCW component 199.

In one aspect, the subband of the BWP may be included in a set of subbands in the BWP, and at 1608, the network node may receive a channel state information (CSI) measurement reported based on the WB SSB, where performing the RACH procedure may include performing the RACH procedure further based at least in part on the CSI measurement report. For example, FIG. 12 at 1224 shows that the base station 1204 may receive a channel state information (CSI) measurement reported based on the WB SSB, where performing the RACH procedure may include performing the RACH procedure further based at least in part on the CSI measurement report. The aforementioned aspect may correspond to the description of FIG. 10. In an example, 1608 may be performed by the FMCW component 199.

In one aspect, at 1602, the network node may transmit a configuration associated with the BWP, where the BWP may encompass a frequency range of the WB SSB, and where performing the RACH procedure may include performing the RACH procedure further based on the configuration. For example, FIG. 12 at 1206 shows that the base station 1204 may transmit a configuration associated with the BWP, where the BWP may encompass a frequency range of the WB SSB, and where performing the RACH procedure at 1234 may include performing the RACH procedure further based on the configuration. In an example, FIG. 9 shows that the initial UL BWP 914 may encompass a frequency range of the WB SSS 928 (and hence a WB SSB). In another example, FIG. 11 shows that the initial UL BWP 1102 may encompass a frequency range of the WB SSS 1116 (and hence a WB SSB). In an example, 1602 may be performed by the FMCW component 199.

In one aspect, the configuration associated with the BWP may configure a first set of RACH occasions (ROs) and a second set of ROs encompassed by the BWP, where the subband may be a first subband, where the first set of ROs may be associated with the first subband and the second set of ROs may be associated with a second subband in the BWP, and where performing the RACH procedure may include performing the RACH procedure further based on at least one RO in the first set of ROs or in the second set of ROs. For example, the aforementioned aspect may correspond to FIG. 9. In an example, the first set of ROs may be the second set of ROs 926 and the second set of ROs may be the first set of ROs 922.

In one aspect, the BWP may be associated with a first edge corresponding to a first frequency and a second edge corresponding to a second frequency, where the first subband may be associated with the first edge, and where the second subband may be associated with the second frequency. For example, the first edge may be the first edge 916 and the second edge may be the second edge 918, where the first edge 916 may be associated with a first frequency and where the second edge may be associated with a second frequency.

In one aspect, the first subband may be associated with a first frequency range and the second subband may be associated with a second frequency range, where the first frequency range may be greater than the second frequency range. For example, the description of FIG. 9 indicates that the second frequency range corresponding to the second subband 924 may be greater than the first frequency range corresponding to the first subband 920.

In one aspect, the subband may be a first subband, where the BWP may include multiple subbands that include the first subband, where the configuration associated with the BWP may configure multiple first sets of RACH occasions (ROs) and a second set of ROs encompassed by the BWP, where the multiple first sets of ROs may be associated with the multiple subbands and the second set of ROs may be associated with the first subband, and where performing the RACH procedure may include performing the RACH procedure further based on at least one RO (1) in a set of ROs in the multiple first sets of ROs or (2) in the second set of ROs. For example, the aforementioned aspect may correspond to the description of FIG. 11, and performing the RACH procedure at 1234 may include performing the RACH procedure further based on at least one RO (1) in a set of ROs in the multiple first sets of ROs or (2) in the second set of ROs.

In one aspect, the WB SSB may include a narrowband primary synchronization signal (PSS), at least one WB secondary synchronization signal (SSS), and physical broadcast channel (PBCH) data. For example, FIG. 7 shows that a WB SSB may include a PSS 704, (at least one) SSS 708, and PBCH data 706. Furthermore, measuring the WB channel via the FMCW channel estimation at 1208 may include measuring the at least one WB SSS.

Figure 17:
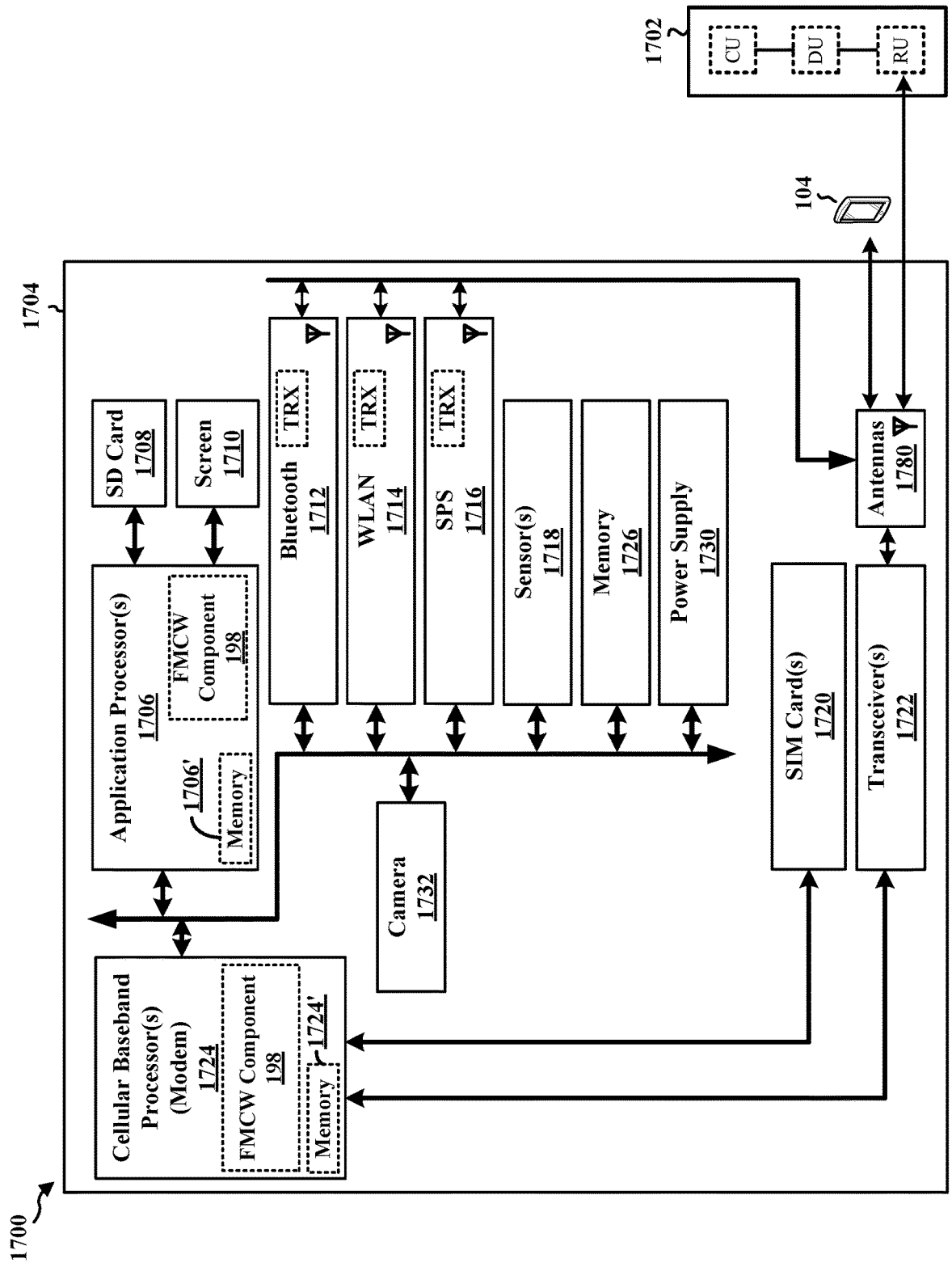
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include at least one cellular baseband processor 1724 (also referred to as a modem) coupled to one or more transceivers 1722 (e.g., cellular RF transceiver). The cellular baseband processor(s) 1724 may include at least one on-chip memory 1724'. In some aspects, the apparatus 1704 may further include one or more subscriber identity modules (SIM) cards 1720 and at least one application processor 1706 coupled to a secure digital (SD) card 1708 and a screen 1710. The application processor(s) 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor(s) 1724 communicates through the transceiver(s) 1722 via one or more antennas 1780 with the UE 104 and/or with an RU associated with a network entity 1702. The cellular baseband processor(s) 1724 and the application processor(s) 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor(s) 1724 and the application processor(s) 1706 are each responsible for general processing, including the execution of software stored on the computer-readable medium/memory. The software, when executed by the cellular baseband processor(s) 1724/application processor(s) 1706, causes the cellular baseband processor(s) 1724/application processor(s) 1706 to perform the various functions described supra. The computer-readable medium/memory may also be used for storing data that is manipulated by the cellular baseband processor(s) 1724/application processor(s) 1706 when executing software. The cellular baseband processor(s) 1724/application processor(s) 1706 may be a component of the UE 350 and may include the at least one memory 360 and/or at least one of the TX processor 368, the RX processor 356, and the controller/processor 359. In one configuration, the apparatus 1704 may be at least one processor chip (modem and/or application) and include just the cellular baseband processor(s) 1724 and/or the application processor(s) 1706, and in another configuration, the apparatus 1704 may be the entire UE (e.g., see UE 350 of FIG. 3) and include the additional modules of the apparatus 1704.

As discussed supra, the FMCW component 198 may be configured to measure a wideband (WB) channel via frequency modulated continuous wave (FMCW) channel estimation. The FMCW component 198 may be configured to select a WB synchronization signal block (SSB) and a subband in a bandwidth part (BWP) based on the measured WB channel. The FMCW component 198 may be configured to perform a random access channel (RACH) procedure based on the WB SSB and the subband in the BWP. The FMCW component 198 may be configured to output an indication of the performed RACH procedure based on the WB SSB and the subband in the BWP. The FMCW component 198 may be configured to transmit, based on the measured DL WB channel, an indication of a suitable subband in the set of subbands in the BWP, where performing the RACH procedure includes performing the RACH procedure further based on the indication of the suitable subband. The FMCW component 198 may be configured to receive, based on the transmitted indication of the suitable subband, scheduling information configured to schedule at least one of an uplink (UL) transmission or a downlink (DL) transmission for the suitable subband, where the UL transmission and the DL transmission are associated with the RACH procedure. The FMCW component 198 may be configured to measure, based on the measured DL WB channel, channel state information (CSI) for each of the set of subbands in the BWP. The FMCW component 198 may be configured to estimate, based on the measured DL WB channel and DL and uplink (UL) channel reciprocity in a time division duplex (TDD) system, an UL WB channel. The FMCW component 198 may be configured to transmit a CSI measurement report based on the measured CSI for each of the set of subbands in the BWP, where performing the RACH procedure includes performing the RACH procedure further based at least in part on the CSI measurement report. The FMCW component 198 may be configured to receive a configuration associated with the BWP, where the BWP encompasses a frequency range of the WB SSB, and where measuring the WB channel includes measuring the WB channel further based on the configuration. The FMCW component 198 may be configured to select at least one RO in the first set of ROs or in the second set of ROs based on the measured WB channel, where performing the RACH procedure includes performing the RACH procedure further based on the at least one selected RO. The FMCW component 198 may be configured to select at least one RO (1) in a set of ROs in the multiple first sets of ROs or (2) in the second set of ROs based on the measured WB channel, where performing the RACH procedure includes performing the RACH procedure further based on the at least one selected RO. The FMCW component 198 may be configured to detect at least one of a master information block (MIB) or a system information block (SIB) on a beam associated with the WB SSB, where performing the RACH procedure includes performing the RACH procedure further based on at least one of the detected MIB or the detected SIB. The FMCW component 198 may be configured to select a message A (msgA) RACH occasion (RO) and a msgA physical uplink shared channel (PUSCH) occasion based on the selected subband. The FMCW component 198 may be within the cellular baseband processor(s) 1724, the application processor(s) 1706, or both the cellular baseband processor(s) 1724 and the application processor(s) 1706. The FMCW component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1704 may include a variety of components configured for various functions. In one configuration, the apparatus 1704, and in particular the cellular baseband processor(s) 1724 and/or the application processor(s) 1706, may include means for measuring a wideband (WB) channel via frequency modulated continuous wave (FMCW) channel estimation. In one configuration, the apparatus 1704, and in particular the cellular baseband processor(s) 1724 and/or the application processor(s) 1706, may include means for selecting a WB synchronization signal block (SSB) and a subband in a bandwidth part (BWP) based on the measured WB channel. In one configuration, the apparatus 1704, and in particular the cellular baseband processor(s) 1724 and/or the application processor(s) 1706, may include means for performing a random access channel (RACH) procedure based on the WB SSB and the subband in the BWP. In one configuration, the apparatus 1704, and in particular the cellular baseband processor(s) 1724 and/or the application processor(s) 1706, may include means for outputting an indication of the performed RACH procedure based on the WB SSB and the subband in the BWP. In one configuration, the apparatus 1704, and in particular the cellular baseband processor(s) 1724 and/or the application processor(s) 1706, may include means for transmitting, based on the measured DL WB channel, an indication of a suitable subband in the set of subbands in the BWP, where performing the RACH procedure includes performing the RACH procedure further based on the indication of the suitable subband. In one configuration, the apparatus 1704, and in particular the cellular baseband processor(s) 1724 and/or the application processor(s) 1706, may include means for receiving, based on the transmitted indication of the suitable subband, scheduling information configured to schedule at least one of an uplink (UL) transmission or a downlink (DL) transmission for the suitable subband, where the UL transmission and the DL transmission are associated with the RACH procedure. In one configuration, the apparatus 1704, and in particular the cellular baseband processor(s) 1724 and/or the application processor(s) 1706, may include means for measuring, based on the measured DL WB channel, channel state information (CSI) for each of the set of subbands in the BWP. In one configuration, the apparatus 1704, and in particular the cellular baseband processor(s) 1724 and/or the application processor(s) 1706, may include means for estimating, based on the measured DL WB channel and DL and uplink (UL) channel reciprocity in a time division duplex (TDD) system, an UL WB channel. In one configuration, the apparatus 1704, and in particular the cellular baseband processor(s) 1724 and/or the application processor(s) 1706, may include means for transmitting a CSI measurement report based on the measured CSI for each of the set of subbands in the BWP, where performing the RACH procedure includes performing the RACH procedure further based at least in part on the CSI measurement report. In one configuration, the apparatus 1704, and in particular the cellular baseband processor(s) 1724 and/or the application processor(s) 1706, may include means for receiving a configuration associated with the BWP, where the BWP encompasses a frequency range of the WB SSB, and where measuring the WB channel includes measuring the WB channel further based on the configuration. In one configuration, the apparatus 1704, and in particular the cellular baseband processor(s) 1724 and/or the application processor(s) 1706, may include means for selecting at least one RO in the first set of ROs or in the second set of ROs based on the measured WB channel, where performing the RACH procedure includes performing the RACH procedure further based on the at least one selected RO. In one configuration, the apparatus 1704, and in particular the cellular baseband processor(s) 1724 and/or the application processor(s) 1706, may include means for selecting at least one RO (1) in a set of ROs in the multiple first sets of ROs or (2) in the second set of ROs based on the measured WB channel, where performing the RACH procedure includes performing the RACH procedure further based on the at least one selected RO. In one configuration, the apparatus 1704, and in particular the cellular baseband processor(s) 1724 and/or the application processor(s) 1706, may include means for detecting at least one of a master information block (MIB) or a system information block (SIB) on a beam associated with the WB SSB, where performing the RACH procedure includes performing the RACH procedure further based on at least one of the detected MIB or the detected SIB. In one configuration, the apparatus 1704, and in particular the cellular baseband processor(s) 1724 and/or the application processor(s) 1706, may include means for selecting a message A (msgA) RACH occasion (RO) and a msgA physical uplink shared channel (PUSCH) occasion based on the selected subband. The means may be the FMCW component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

Figure 18:
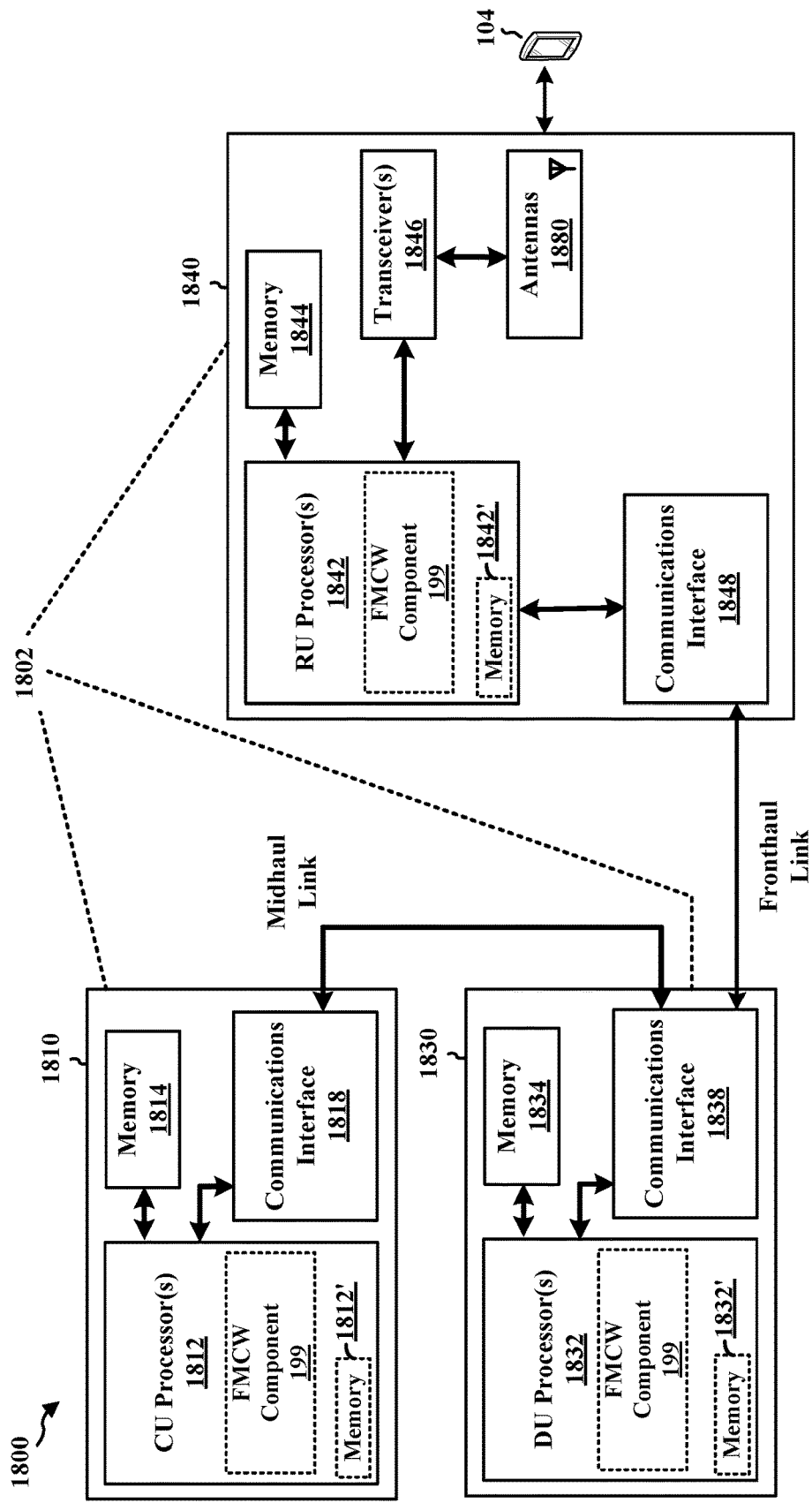
FIG. 18 is a diagram illustrating an example of a hardware implementation for an example network entity.

FIG. 18 is a diagram 1800 illustrating an example of a hardware implementation for a network entity 1802. The network entity 1802 may be a BS, a component of a BS, or may implement BS functionality. The network entity 1802 may include at least one of a CU 1810, a DU 1830, or an RU 1840. For example, depending on the layer functionality handled by the FMCW component 199, the network entity 1802 may include the CU 1810; both the CU 1810 and the DU 1830; each of the CU 1810, the DU 1830, and the RU

1840; the DU 1830; both the DU 1830 and the RU 1840; or the RU 1840. The CU 1810 may include at least one CU processor 1812. The CU processor(s) 1812 may include on-chip memory 1812'. In some aspects, the CU 1810 may further include additional memory modules 1814 and a communications interface 1818. The CU 1810 communicates with the DU 1830 through a midhaul link, such as an F1 interface. The DU 1830 may include at least one DU processor 1832. The DU processor(s) 1832 may include on-chip memory 1832'. In some aspects, the DU 1830 may further include additional memory modules 1834 and a communications interface 1838. The DU 1830 communicates with the RU 1840 through a fronthaul link. The RU 1840 may include at least one RU processor 1842. The RU processor(s) 1842 may include on-chip memory 1842'. In some aspects, the RU 1840 may further include additional memory modules 1844, one or more transceivers 1846, antennas 1880, and a communications interface 1848. The RU 1840 communicates with the UE 104. The on-chip memory 1812', 1832', 1842' and the additional memory modules 1814, 1834, 1844 may each be considered a computer-readable medium/memory. Each computer-readable medium/memory may be non-transitory. Each of the processors 1812, 1832, 1842 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the FMCW component 199 may be configured to transmit a wideband (WB) synchronization signal block (SSB), where the WB SSB is associated with a bandwidth part (BWP) and a subband in the BWP. The FMCW component 199 may be configured to perform a random access channel (RACH) procedure based on the WB SSB, where the RACH procedure is associated with a WB channel, and where the WB channel is associated with frequency modulated continuous wave (FMCW) channel estimation. The FMCW component 199 may be configured to receive an indication of a suitable subband in the set of subbands in the BWP, where performing the RACH procedure includes performing the RACH procedure further based on the indication of the suitable subband. The FMCW component 199 may be configured to transmit, based on the received indication of the suitable subband, scheduling information configured to schedule at least one of an uplink (UL) transmission or a downlink (DL) transmission for the suitable subband, where the UL transmission and the DL transmission are associated with the RACH procedure. The FMCW component 199 may be configured to receive a channel state information (CSI) measurement reported based on the WB SSB, where performing the RACH procedure includes performing the RACH procedure further based at least in part on the CSI measurement report. The FMCW component 199 may be configured to transmit a configuration associated with the BWP, where the BWP encompasses a frequency range of the WB SSB, and where performing the RACH procedure includes performing the RACH procedure further based on the configuration. The FMCW component 199 may be within one or more processors of one or more of the CU 1810, DU 1830, and the RU 1840. The FMCW component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1802 may include a variety of components configured for various functions. In one configuration, the network entity 1802 may include means for transmitting a wideband (WB) synchronization signal block (SSB), where the WB SSB is associated with a bandwidth part (BWP) and a subband in the BWP. In one configuration, the network entity 1802 may include means for performing a random access channel (RACH) procedure based on the WB SSB, where the RACH procedure is associated with a WB channel, and where the WB channel is associated with frequency modulated continuous wave (FMCW) channel estimation. In one configuration, the network entity 1802 may include means for receiving an indication of a suitable subband in the set of subbands in the BWP, where performing the RACH procedure includes performing the RACH procedure further based on the indication of the suitable subband. In one configuration, the network entity 1802 may include means for transmitting, based on the received indication of the suitable subband, scheduling information configured to schedule at least one of an uplink (UL) transmission or a downlink (DL) transmission for the suitable subband, where the UL transmission and the DL transmission are associated with the RACH procedure. In one configuration, the network entity 1802 may include means for receiving a channel state information (CSI) measurement reported based on the WB SSB, where performing the RACH procedure includes performing the RACH procedure further based at least in part on the CSI measurement report. In one configuration, the network entity 1802 may include means for transmitting a configuration associated with the BWP, where the BWP encompasses a frequency range of the WB SSB, and where performing the RACH procedure includes performing the RACH procedure further based on the configuration. The means may be the FMCW component 199 of the network entity 1802 configured to perform the functions recited by the means. As described supra, the network entity 1802 may include the TX processor 316, the RX processor 370, and the controller/processor 375. As such, in one configuration, the means may be the TX processor 316, the RX processor 370, and/or the controller/processor 375 configured to perform the functions recited by the means.

UEs in some wireless communication systems (e.g., 5G NR) may estimate a channel for wireless communications using OFDM based channel estimation. However, a UE that utilizes OFDM based channel estimation may not be able to estimate a channel over an entire bandwidth in a single pass. Instead, the UE may utilize frequency hopping in order to estimate the channel, which may be associated with increased power consumption and/or an increased amount of time to estimate the channel. FMCW based channel estimation may enable a UE to estimate a channel over an entire bandwidth in a single pass. However, a RACH procedure in a wireless communication system may not be configured for FMCW based channel estimation.

Various technologies pertaining to an enhanced RACH procedure based on FMCW channel sounding are described herein. In an example, a UE measures a wideband (WB) channel via frequency modulated continuous wave (FMCW) channel estimation. The UE selects a WB synchronization signal block (SSB) and a subband in a bandwidth part (BWP) based on the measured WB channel. The UE performs a random access channel (RACH) procedure based on the WB SSB and the subband in the BWP. The UE outputs an indication of the performed RACH procedure based on the WB SSB and the subband in the BWP. Vis-à-vis measuring the WB channel via FMCW channel estimation and performing the RACH procedure based on a WB SSB and a subband that are selected based on the measured WB channel, the UE may be able to transmit and/or receive wireless communications in a more rapid manner compared to a UE that utilizes OFDM based channel estimation to estimate a channel. Furthermore, the UE may utilize less power compared to a UE that utilizes OFDM based channel estimation to estimate a channel.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: measuring a wideband (WB) channel via frequency modulated continuous wave (FMCW) channel estimation; selecting a WB synchronization signal block (SSB) and a subband in a bandwidth part (BWP) based on the measured WB channel; performing a random access channel (RACH) procedure based on the WB SSB and the subband in the BWP; and outputting an indication of the performed RACH procedure based on the WB SSB and the subband in the BWP.

Aspect 2 is the method of aspect 1, wherein outputting the indication of the performed RACH procedure includes: transmitting the indication of the performed RACH procedure based on the WB SSB and the subband in the BWP; or storing the indication of the performed RACH procedure based on the WB SSB and the subband in the BWP.

Aspect 3 is the method of any of aspects 1-2, wherein the WB channel is a downlink (DL) WB channel, and wherein measuring the WB channel via the FMCW channel estimation includes: measuring the DL WB channel via the FMCW channel estimation.

Aspect 4 is the method of aspect 3, further including: estimating, based on the measured DL WB channel and DL and uplink (UL) channel reciprocity in a time division duplex (TDD) system, an UL WB channel.

Aspect 5 is the method of any of aspects 3-4, wherein the subband in the BWP is included in a set of subbands in the BWP, the method further including: transmitting, based on the measured DL WB channel, an indication of a suitable subband in the set of subbands in the BWP, wherein performing the RACH procedure includes performing the RACH procedure further based on the indication of the suitable subband.

Aspect 6 is the method of aspect 5, further including: receiving, based on the transmitted indication of the suitable subband, scheduling information configured to schedule at least one of an uplink (UL) transmission or a downlink (DL)

transmission for the suitable subband, wherein the UL transmission and the DL transmission are associated with the RACH procedure.

Aspect 7 is the method of any of aspects 3-6, wherein the subband of the BWP is included in a set of subbands in the BWP, the method further including: measuring, based on the measured DL WB channel, channel state information (CSI) for each of the set of subbands in the BWP; and transmitting a CSI measurement report based on the measured CSI for each of the set of subbands in the BWP, wherein performing the RACH procedure includes performing the RACH procedure further based at least in part on the CSI measurement report.

Aspect 8 is the method of any of aspects 1-7, further including: receiving a configuration associated with the BWP, wherein the BWP encompasses a frequency range of the WB SSB, and wherein measuring the WB channel includes measuring the WB channel further based on the configuration.

Aspect 9 is the method of aspect 8, wherein the configuration associated with the BWP configures a first set of RACH occasions (ROs) encompassed by the BWP and a second set of ROs encompassed by the BWP, wherein the subband is a first subband, wherein the first set of ROs is associated with the first subband and the second set of ROs is associated with a second subband in the BWP, the method further including: selecting at least one RO in the first set of ROs or in the second set of ROs based on the measured WB channel, wherein performing the RACH procedure includes performing the RACH procedure further based on the at least one selected RO.

Aspect 10 is the method of aspect 9, wherein the BWP is associated with a first edge corresponding to a first frequency and a second edge corresponding to a second frequency, wherein the first subband is associated with the first edge, and wherein the second subband is associated with the second frequency.

Aspect 11 is the method of any of aspects 9-10, wherein the first subband is associated with a first frequency range and the second subband is associated with a second frequency range, wherein the first frequency range is greater than the second frequency range.

Aspect 12 is the method of any of aspects 8 and 10-11, wherein the subband is a first subband, wherein the BWP includes multiple subbands that include the first subband, wherein the configuration associated with the BWP configures multiple first sets of RACH occasions (ROs) encompassed by the BWP and a second set of ROs encompassed by the BWP, wherein the multiple first sets of ROs are associated with the multiple subbands and the second set of ROs is associated with the first subband, the method further including: selecting at least one RO (1) in a set of ROs in the multiple first sets of ROs or (2) in the second set of ROs based on the measured WB channel, wherein performing the RACH procedure includes performing the RACH procedure further based on the at least one selected RO.

Aspect 13 is the method of any of aspects 1-12, further including: detecting at least one of a master information block (MIB) or a system information block (SIB) on a beam associated with the WB SSB, wherein performing the RACH procedure includes performing the RACH procedure further based on at least one of the detected MIB or the detected SIB.

Aspect 14 is the method of any of aspects 1-13, further including: selecting a message A (msgA) RACH occasion (RO) and a msgA physical uplink shared channel (PUSCH) occasion based on the selected subband.

Aspect 15 is the method of any of aspects 1-14, wherein the WB SSB includes a narrowband primary synchronization signal (PSS), at least one WB secondary synchronization signal (SSS), and physical broadcast channel (PBCH) data, and wherein measuring the WB channel via the FMCW channel estimation includes measuring the at least one WB SSS.

Aspect 16 is an apparatus for wireless communication at a user equipment (UE), comprising at least one memory and at least one processor coupled to the at least one memory and, based at least in part on information stored in the at least one memory, the at least one processor, individually or in any combination, is configured to implement a method as in any of aspects 1-15.

Aspect 17 is the apparatus of aspect 16, further comprising at least one of a transceiver or an antenna coupled to the at least one processor, wherein to perform the RACH procedure, the at least one processor, individually or in any combination, is configured to perform the RACH procedure via at least one of the transceiver or the antenna.

Aspect 18 is an apparatus for wireless communications, including means for performing a method in accordance with any of aspects 1-15.

Aspect 19 is a computer-readable medium (e.g., a non-transitory computer-readable medium) storing computer executable code at a user equipment (UE) that, when executed by at least one processor, causes the at least one processor to perform a method in accordance with any of aspects 1-15.

Aspect 20 is the method of wireless communication at a network node, including: transmitting a wideband (WB) synchronization signal block (SSB), wherein the WB SSB is associated with a bandwidth part (BWP) and a subband in the BWP; and performing a random access channel (RACH) procedure based on the WB SSB, wherein the RACH procedure is associated with a WB channel, and wherein the WB channel is associated with frequency modulated continuous wave (FMCW) channel estimation.

Aspect 21 is the method of aspect 20, wherein the subband in the BWP is included in a set of subbands in the BWP, the method further including: receiving an indication of a suitable subband in the set of subbands in the BWP, wherein performing the RACH procedure includes performing the RACH procedure further based on the indication of the suitable subband.

Aspect 22 is the method of aspect 21, further including: transmitting, based on the received indication of the suitable subband, scheduling information configured to schedule at least one of an uplink (UL) transmission or a downlink (DL) transmission for the suitable subband, wherein the UL transmission and the DL transmission are associated with the RACH procedure.

Aspect 23 is the method of any of aspects 20-22, wherein the subband of the BWP is included in a set of subbands in the BWP, the method further including: receiving a channel state information (CSI) measurement reported based on the WB SSB, wherein performing the RACH procedure includes performing the RACH procedure further based at least in part on the CSI measurement report.

Aspect 24 is the method of any of aspects 20-23, further including: transmitting a configuration associated with the BWP, wherein the BWP encompasses a frequency range of the WB SSB, and wherein performing the RACH procedure includes performing the RACH procedure further based on the configuration.

Aspect 25 is the method of aspect 24, wherein the configuration associated with the BWP configures a first set of RACH occasions (ROs) and a second set of ROs encompassed by the BWP, wherein the subband is a first subband, wherein the first set of ROs is associated with the first subband and the second set of ROs is associated with a second subband in the BWP, and wherein performing the RACH procedure includes performing the RACH procedure further based on at least one RO in the first set of ROs or in the second set of ROs.

Aspect 26 is the method of aspect 25, wherein the BWP is associated with a first edge corresponding to a first frequency and a second edge corresponding to a second frequency, wherein the first subband is associated with the first edge, and wherein the second subband is associated with the second frequency.

Aspect 27 is the method of any of aspects 25-26, wherein the first subband is associated with a first frequency range and the second subband is associated with a second frequency range, wherein the first frequency range is greater than the second frequency range.

Aspect 28 is the method of any of aspects 24 and 26-27, wherein the subband is a first subband, wherein the BWP includes multiple subbands that include the first subband, wherein the configuration associated with the BWP configures multiple first sets of RACH occasions (ROs) and a second set of ROs encompassed by the BWP, wherein the multiple first sets of ROs are associated with the multiple subbands and the second set of ROs is associated with the first subband, and wherein performing the RACH procedure includes performing the RACH procedure further based on at least one RO (1) in a set of ROs in the multiple first sets of ROs or (2) in the second set of ROs.

Aspect 29 is the method of any of aspects 20-28, wherein the WB SSB includes a narrowband primary synchronization signal (PSS), at least one WB secondary synchronization signal (SSS), and physical broadcast channel (PBCH) data.

Aspect 30 is an apparatus for wireless communication at a network node, comprising at least one memory and at least one processor coupled to the at least one memory and, based at least in part on information stored in the at least one memory, the at least one processor, individually or in any combination, is configured to implement a method as in any of aspects 20-29.

Aspect 31 is the apparatus of aspect 30, further comprising at least one of a transceiver or an antenna coupled to the at least one processor, wherein to perform the RACH procedure, the at least one processor, individually or in any combination, is configured to perform the RACH procedure via at least one of the transceiver or the antenna.

Aspect 32 is an apparatus for wireless communications, including means for performing a method in accordance with any of aspects 20-29.

Aspect 33 is a computer-readable medium (e.g., a non-transitory computer-readable medium) storing computer executable code at a network node that, when executed by at least one processor, causes the at least one processor to perform a method in accordance with any of aspects 20-29.

What is claimed is:

1. An apparatus for wireless communication at a user equipment (UE), comprising:
at least one memory; and
at least one processor coupled to the at least one memory and, based at least in part on information stored in the at least one memory, the at least one processor, individually or in any combination, is configured to:
measure a wideband (WB) channel via frequency modulated continuous wave (FMCW) channel estimation;
select a WB synchronization signal block (SSB) and a subband in a bandwidth part (BWP) based on the measured WB channel;
perform a random access channel (RACH) procedure based on the WB SSB and the subband in the BWP; and
output an indication of the performed RACH procedure based on the WB SSB and the subband in the BWP.

2. The apparatus of claim 1, wherein to output the indication of the performed RACH procedure, the at least one processor, individually or in any combination, is configured to:
transmit the indication of the performed RACH procedure based on the WB SSB and the subband in the BWP; or
store the indication of the performed RACH procedure based on the WB SSB and the subband in the BWP.

3. The apparatus of claim 1, wherein the WB channel is a downlink (DL) WB channel, and wherein to measure the WB channel via the FMCW channel estimation, the at least one processor, individually or in any combination, is configured to:
measure the DL WB channel via the FMCW channel estimation.

4. The apparatus of claim 3, wherein the at least one processor, individually or in any combination, is further configured to:
estimate, based on the measured DL WB channel and DL and uplink (UL) channel reciprocity in a time division duplex (TDD) system, an UL WB channel.

5. The apparatus of claim 3, wherein the subband in the BWP is included in a set of subbands in the BWP, wherein the at least one processor, individually or in any combination, is further configured to:
transmit, based on the measured DL WB channel, an indication of a suitable subband in the set of subbands in the BWP, wherein to perform the RACH procedure, the at least one processor, individually or in any combination, is configured to perform the RACH procedure further based on the indication of the suitable subband.

6. The apparatus of claim 5, wherein the at least one processor, individually or in any combination, is further configured to:
receive, based on the transmitted indication of the suitable subband, scheduling information configured to schedule at least one of an uplink (UL) transmission or a downlink (DL) transmission for the suitable subband, wherein the UL transmission and the DL transmission are associated with the RACH procedure.

7. The apparatus of claim 3, wherein the subband of the BWP is included in a set of subbands in the BWP, wherein the at least one processor, individually or in any combination, is further configured to:
measure, based on the measured DL WB channel, channel state information (CSI) for each of the set of subbands in the BWP; and
transmit a CSI measurement report based on the measured CSI for each of the set of subbands in the BWP, wherein to perform the RACH procedure, the at least one processor, individually or in any combination, is configured to perform the RACH procedure further based at least in part on the CSI measurement report.

8. The apparatus of claim 1, wherein the at least one processor, individually or in any combination, is further configured to:

receive a configuration associated with the BWP, wherein the BWP encompasses a frequency range of the WB SSB, and wherein to measure the WB channel, the at least one processor, individually or in any combination, is configured to measure the WB channel further based on the configuration.

9. The apparatus of claim 8, wherein the configuration associated with the BWP configures a first set of RACH occasions (ROs) encompassed by the BWP and a second set of ROs encompassed by the BWP, wherein the subband is a first subband, wherein the first set of ROs is associated with the first subband and the second set of ROs is associated with a second subband in the BWP, wherein the at least one processor, individually or in any combination, is further configured to:
  select at least one RO in the first set of ROs or in the second set of ROs based on the measured WB channel, wherein to perform the RACH procedure, the at least one processor, individually or in any combination, is configured to perform the RACH procedure further based on the at least one selected RO.

10. The apparatus of claim 9, wherein the BWP is associated with a first edge corresponding to a first frequency and a second edge corresponding to a second frequency, wherein the first subband is associated with the first edge, and wherein the second subband is associated with the second frequency.

11. The apparatus of claim 9, wherein the first subband is associated with a first frequency range and the second subband is associated with a second frequency range, wherein the first frequency range is greater than the second frequency range.

12. The apparatus of claim 8, wherein the subband is a first subband, wherein the BWP comprises multiple subbands that include the first subband, wherein the configuration associated with the BWP configures multiple first sets of RACH occasions (ROs) encompassed by the BWP and a second set of ROs encompassed by the BWP, wherein the multiple first sets of ROs are associated with the multiple subbands and the second set of ROs is associated with the first subband, wherein the at least one processor, individually or in any combination, is further configured to:
  select at least one RO (1) in a set of ROs in the multiple first sets of ROs or (2) in the second set of ROs based on the measured WB channel, wherein to perform the RACH procedure, the at least one processor, individually or in any combination, is configured to perform the RACH procedure further based on the at least one selected RO.

13. The apparatus of claim 1, wherein the at least one processor, individually or in any combination, is further configured to:
  detect at least one of a master information block (MIB) or a system information block (SIB) on a beam associated with the WB SSB, wherein to perform the RACH procedure, the at least one processor, individually or in any combination, is configured to perform the RACH procedure further based on at least one of the detected MIB or the detected SIB.

14. The apparatus of claim 1, wherein the at least one processor, individually or in any combination, is further configured to:
  select a message A (msgA) RACH occasion (RO) and a msgA physical uplink shared channel (PUSCH) occasion based on the selected subband.

15. The apparatus of claim 1, wherein the WB SSB comprises a narrowband primary synchronization signal (PSS), at least one WB secondary synchronization signal (SSS), and physical broadcast channel (PBCH) data, and wherein to measure the WB channel via the FMCW channel estimation, the at least one processor, individually or in any combination, is configured to measure the at least one WB SSS.

16. The apparatus of claim 1, further comprising at least one of a transceiver or an antenna coupled to the at least one processor, wherein to perform the RACH procedure, the at least one processor, individually or in any combination, is configured to perform the RACH procedure via at least one of the transceiver or the antenna.

17. An apparatus for wireless communication at a network node, comprising:
  at least one memory; and
  at least one processor coupled to the at least one memory and, based at least in part on information stored in the at least one memory, the at least one processor, individually or in any combination, is configured to:
    transmit a wideband (WB) synchronization signal block (SSB), wherein the WB SSB is associated with a bandwidth part (BWP) and a subband in the BWP; and
    perform a random access channel (RACH) procedure based on the WB SSB, wherein the RACH procedure is associated with a WB channel, and wherein the WB channel is associated with frequency modulated continuous wave (FMCW) channel estimation.

18. The apparatus of claim 17, wherein the subband in the BWP is included in a set of subbands in the BWP, wherein the at least one processor, individually or in any combination, is further configured to:
  receive an indication of a suitable subband in the set of subbands in the BWP, wherein to perform the RACH procedure, the at least one processor, individually or in any combination, is configured to perform the RACH procedure further based on the indication of the suitable subband.

19. The apparatus of claim 18, wherein the at least one processor, individually or in any combination, is further configured to:
  transmit, based on the received indication of the suitable subband, scheduling information configured to schedule at least one of an uplink (UL) transmission or a downlink (DL) transmission for the suitable subband, wherein the UL transmission and the DL transmission are associated with the RACH procedure.

20. The apparatus of claim 17, wherein the subband of the BWP is included in a set of subbands in the BWP, wherein the at least one processor, individually or in any combination, is further configured to:
  receive a channel state information (CSI) measurement reported based on the WB SSB, wherein to perform the RACH procedure, the at least one processor, individually or in any combination, is configured to perform the RACH procedure further based at least in part on the CSI measurement report.

21. The apparatus of claim 17, wherein the at least one processor, individually or in any combination, is further configured to:
  transmit a configuration associated with the BWP, wherein the BWP encompasses a frequency range of the WB SSB, and wherein to perform the RACH procedure, the at least one processor, individually or in any combination, is configured to perform the RACH procedure further based on the configuration.

22. The apparatus of claim 21, wherein the configuration associated with the BWP configures a first set of RACH occasions (ROs) and a second set of ROs encompassed by the BWP, wherein the subband is a first subband, wherein the first set of ROs is associated with the first subband and the second set of ROs is associated with a second subband in the BWP, and wherein to perform the RACH procedure, the at least one processor, individually or in any combination, is configured to perform the RACH procedure further based on at least one RO in the first set of ROs or in the second set of ROs.

23. The apparatus of claim 22, wherein the BWP is associated with a first edge corresponding to a first frequency and a second edge corresponding to a second frequency, wherein the first subband is associated with the first edge, and wherein the second subband is associated with the second frequency.

24. The apparatus of claim 22, wherein the first subband is associated with a first frequency range and the second subband is associated with a second frequency range, wherein the first frequency range is greater than the second frequency range.

25. The apparatus of claim 21, wherein the subband is a first subband, wherein the BWP comprises multiple subbands that include the first subband, wherein the configuration associated with the BWP configures multiple first sets of RACH occasions (ROs) and a second set of ROs encompassed by the BWP, wherein the multiple first sets of ROs are associated with the multiple subbands and the second set of ROs is associated with the first subband, and wherein to perform the RACH procedure, the at least one processor, individually or in any combination, is configured to perform the RACH procedure further based on at least one RO (1) in a set of ROs in the multiple first sets of ROs or (2) in the second set of ROs.

26. The apparatus of claim 17, wherein the WB SSB comprises a narrowband primary synchronization signal (PSS), at least one WB secondary synchronization signal (SSS), and physical broadcast channel (PBCH) data.

27. The apparatus of claim 17, further comprising at least one of a transceiver or an antenna coupled to the at least one processor, wherein to perform the RACH procedure, the at least one processor, individually or in any combination, is configured to perform the RACH procedure via at least one of the transceiver or the antenna.

28. A method of wireless communication at a user equipment (UE), comprising:
measuring a wideband (WB) channel via frequency modulated continuous wave (FMCW) channel estimation;
selecting a WB synchronization signal block (SSB) and a subband in a bandwidth part (BWP) based on the measured WB channel;
performing a random access channel (RACH) procedure based on the WB SSB and the subband in the BWP; and
outputting an indication of the performed RACH procedure based on the WB SSB and the subband in the BWP.

29. The method of claim 28, further comprising:
receiving a configuration associated with the BWP, wherein the BWP encompasses a frequency range of the WB SSB, and wherein measuring the WB channel comprises measuring the WB channel further based on the configuration.

30. A method of wireless communication at a network node, comprising:
transmitting a wideband (WB) synchronization signal block (SSB), wherein the WB SSB is associated with a bandwidth part (BWP) and a subband in the BWP; and
performing a random access channel (RACH) procedure based on the WB SSB, wherein the RACH procedure is associated with a WB channel, and wherein the WB channel is associated with frequency modulated continuous wave (FMCW) channel estimation.

\* \* \* \* \*